(12) United States Patent
Luby et al.

(10) Patent No.: US 6,486,803 B1
(45) Date of Patent: **\*Nov. 26, 2002**

(54) ON DEMAND ENCODING WITH A WINDOW

(75) Inventors: Michael G. Luby, Berkeley, CA (US); Gavin Horn, Emeryville, CA (US); Jeffrey J. Persch, Albany, CA (US); John Byers, Newton, MA (US); Armin Haken, San Francisco, CA (US); Mike Mitzenmacher, Belmont, MA (US)

(73) Assignee: Digital Fountain, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/668,452

(22) Filed: Sep. 22, 2000

(51) Int. Cl.⁷ ............................................. H03M 11/00

(52) U.S. Cl. .......................................... 341/50; 714/15

(58) Field of Search .............................. 341/50, 51, 55, 341/60; 714/15

(56) References Cited

U.S. PATENT DOCUMENTS

| | | | |
|---|---|---|---|
| 4,365,338 A | 12/1982 | McRae et al. ................. | 370/79 |
| 5,379,297 A | 1/1995 | Glover et al. .............. | 370/60.1 |
| 5,432,787 A | 7/1995 | Chethik ........................ | 375/79 |
| 5,608,738 A | 3/1997 | Matsushita ................. | 371/37.1 |
| 5,617,541 A | 4/1997 | Albanese et al. ...... | 395/200.13 |
| 5,659,614 A | 8/1997 | Bailey, III ...................... | 350/4 |
| 5,805,825 A | 9/1998 | Danneels et al. ...... | 395/200.73 |
| 5,835,165 A | 11/1998 | Keale et al. | |
| 5,889,794 A | 3/1999 | Mo et al. ................. | 371/37.11 |
| 5,903,775 A | 5/1999 | Murray ........................ | 395/853 |
| 5,936,949 A | 8/1999 | Pasternak et al. ........... | 370/238 |
| 5,983,383 A | 11/1999 | Wolf ........................... | 714/755 |
| 5,992,737 A | 11/1999 | Kubota ....................... | 235/380 |
| 5,993,056 A | 11/1999 | Vaman et al. ............. | 371/37.02 |
| 6,011,590 A | 1/2000 | Saukkonen ................. | 348/419 |
| 6,073,250 A | 6/2000 | Luby et al. ..................... | 714/6 |
| 6,081,909 A | 6/2000 | Luby et al. ................. | 714/701 |
| 6,081,918 A | 6/2000 | Spielman .................... | 714/746 |
| 6,141,053 A | 10/2000 | Saukkonen .................. | 375/12 |

(List continued on next page.)

FOREIGN PATENT DOCUMENTS

| | | | |
|---|---|---|---|
| EP | 0 854 650 A2 | 7/1998 | ............ H04N/7/24 |
| WO | WO 96 34463 A | 10/1996 | ............ H04B/1/74 |
| WO | WO 01/57667 A1 | 8/2001 | ........... G06F/11/00 |
| WO | WO 01/58130 A2 | 8/2001 | ............ H04N/7/24 |
| WO | WO 01/58131 A2 | 8/2001 | ........... G06F/15/16 |

OTHER PUBLICATIONS

Alon, et al., "Linear Time Erasure Codes With Nearly Optimal Recovery," Proceedings Of The Annual Symposium On Foundations Of Computer Science, US, Los Alamitos, IEEE Comp. Soc. Press, vol. Symp. 36, pp. 512–516 (Oct. 23, 1995), XP 000557871.

(List continued on next page.)

Primary Examiner—Peguy JeanPierre
(74) Attorney, Agent, or Firm—Philip H. Albert, Esq.; Townsend and Townsend and Crew LLP

(57) ABSTRACT

An encoder encodes an output symbol from input symbols of an input file by determining, for a given output symbol, a list AL that indicates W associated input symbols, within a subset S of the input symbols comprising the input file, to be associated with the output symbol, where W is a positive integer, where at least two output symbols have different values for W associated therewith, where W is greater than one for at least one output symbol, and where the number of possible output symbols is much larger than the number of input symbols in the input file, and generating an output symbol value from a predetermined function of the W associated input symbols indicated by AL. The subset S can be a window that slides over the input file to cover all of the input symbols in a period. The window can be a fixed or variable size. Where the window moves over the file and reaches an edge, the window can wrap around or can cover extended input symbols.

44 Claims, 8 Drawing Sheets

U.S. PATENT DOCUMENTS

| | | | | |
|---|---|---|---|---|
| 6,163,870 | A | 12/2000 | Luby et al. | 714/755 |
| 6,178,536 | B1 | 1/2001 | Sorkin | 714/66 |
| 6,185,265 | B1 | 2/2001 | Campanella | 375/341 |
| 6,195,777 | B1 | 2/2001 | Luby et al. | 714/752 |
| 6,212,657 | B1 | 4/2001 | Wang et al. | 714/746 |
| 6,292,514 | B1 | 9/2001 | Yamaguchi et al. | 375/240.21 |
| 6,307,487 | B1 * | 10/2001 | Luby | |
| 6,320,520 | B1 | 11/2001 | Luby | 341/50 |

OTHER PUBLICATIONS

Bigloo, et al. "A Robust Rate–Adaptive Hybrid ARQ Scheme For Frequency–Hopped Spread–Spectrum Multiple–Access Communication Systems" IEEE Journal On Selected Areas In Communications, US, IEEE Inc, New York, (Jun. 1, 1994) pp. 917–924, XP0000464977.

Blömer, et al., "An XOR–Based Erasure–Resilient Coding Scheme," ICSI Technical Report No. TR–95–048 (1995) [avail. at ftp://ftp.icsi.berkeley.edu/pub/techreports/1995/tr–95–048.pdf].

Byers, et al., "A Digital Fountain Approach to Reliable Distribution of Bulk Data", International Computer Science Institute Technical Report TR–98–013 (May, 1998) [available at ftp://ftp.icsi.berkeley.edu/pub/techreports/1998/tr–98–013.pdf].

Byers, et al., "Accessing Multiple Mirror Sites in Parallel: Using Tornado Codes to Speed Up Downloads," International Computer Science Institute Technical Report TR–98–021 (1998) [available at http://www.icsi.berkeley.edu/~luby/PAPERS/mirrdown.ps].

Byers, et al. "Accessing Multiple Mirror Sites In Parallel: Using Tornado Codes To Speed Up Downloads" Proceeding IEEE Infocom. The Conference On Computer Communications, US New York, (Mar. 21, 1999) pp. 275–283, XP000868811.

Esaki, et al. "Reliable IP Multicast Communication Over ATM Networks Using Forward Error Correction Policy" IEICE Transactions On Communications, JP, Institute of Electronics Information and Comm. ENG. Tokyo, vol. E78–V, No. 12, (Dec. 1995), pp. 1622–1637, XP000556183.

Luby, et al., "Analysis of Low Density Codes and Improved Designs Using Irregular Graphs", International Computer Science Institute Technical Report TR–97–045 (Nov., 1997) [available at ftp://ftp.icsi.berkeley.edu/pub/techreports/1997/tr–97–045.pdf].

Luby, et al., "Analysis of Random Processes via And–Or Tree Evaluation," ICSI Technical Report No. TR–97–042 (1997) and Proceedings of the 9th Annual ACM Symposium on Discrete Algorithms (1998) [available at ftp://ftp.icsi.berkeley.edu/pub/techreports/1997/tr–97–042.pdf].

Luby, et al., "Improved Low–density Parity–Check Codes Using Irregular Graphs and Belief Propagation", International Computer Science Institute Technical Report TR–97–044 (Nov., 1997) [available at ftp://ftp.icsi.berkeley.edu/pub/techreports/1997/tr–97–044.pdf].

Luby, et al., "Tornado Codes," Practical Loss–Resilient Codes, 29th Annual ACM Symposium on Theory of Computing (1997).

Pursley, et al. "Variable–Rate Coding For Meteor–Burst Communications" IEEE Transactions on Communictions, US, IEEE Inc. New York (1989) vol. 37, No. 11, pp. 1105–1112, XP000074533.

Seshan el al. "Handoffs In Cellular Wireless Networks: The Daedalus Implementation and Experience" Wireless Personal Communications, NL, Kluwer Academic Publishers, vol. 4, No. 2, Mar. 1, 1997, pp. 141–162, XP000728589.

Shacham, N., "Packet Recovery And Error Correction In High–Speed Wide–Area Networks," Proceedings Of The Military Communications Conference. (Milcom), US, New York, IEEE, vol. 1, pp. 551–557, (1989), XP 000131876.

* cited by examiner

ON DEMAND ENCODING WITH A WINDOW

CROSS-REFERENCES TO RELATED APPLICATIONS

The present disclosure builds on the teachings of U.S. Pat. No. 6,307,487 (U.S. patent application Ser. No. 09/246,015, filed Feb. 5, 1999 and entitled "Information Additive Code Generator And Decoder For Communication Systems") (hereinafter "Luby I") and U.S. Pat. No. 6,320,520 (U.S. patent application Ser. No. 09/399,201, filed Sep. 17, 1999 and entitled "Information Additive Group Code Generator And Decoder For Communication Systems" (hereinafter "Luby II"), both of which are incorporated herein by reference for all purposes.

FIELD OF THE INVENTION

The present invention relates to encoding and decoding data in communications systems and more specifically to communication systems that encode and decode data using a chain reaction coder wherein the associates used to generate an output symbol are selected from a window comprising less than all of the input symbols.

BACKGROUND OF THE INVENTION

As described in Luby I and Luby II, chain reaction coding is useful in many communications systems. With chain reaction coding, output symbols are generated from a set of input symbols according to associations of input symbols with the output symbols.

In one embodiment, for example, an encoder generates an output symbol from a key, I, of the output symbol, where the number of possible keys, and therefore output symbols, is much larger than the number of input symbols. The encoder determines a list, AL(I), of W(I) input symbols to be associated with the output symbol and calculates a value, B(I), for the output symbol. Luby I and Luby II describe various methods and apparatus for calculating W(I) from I, calculating AL(I) from I and W(I), and generating B(I) from one or more of AL(I), W(I) and I. The decoder receives output symbols, and when sufficient output symbols are received, the decoder can calculate values for input symbols from the values of the output symbols. This process is referred to herein as "chain reaction coding" because once a decoder decodes an input symbol, that result can be used in combination with information about other received output symbols to decode more input symbols, which in turn may lead to an ability to decode even more input symbols.

Where the encoder and decoder are optimized, the decoder can entirely recover an input file of K input symbols from a received set of K+a output symbols most of the time. In one decoding process, the decoder waits for receipt of K+a output symbols. In many communications systems, the channel is not perfect, so some output symbols may have been lost. In general, the decoder does not assume that is has received a specific or contiguous K+a output symbols, but instead operates on the assumption that the particular K+a output symbols are arbitrarily distributed among the possible output symbols. In a decoding process, the decoder uses the K+a output symbols to attempt to decode as many of the input symbols as possible. With the proper selection of a, most of the time, the decoder will decode all of the input symbols before using all of the K+a output symbols. In the ideal case, the decoder just finishes recovering all of the input symbols when it runs out of output symbols, so that no output symbols are wasted and no more output symbols are needed. Of course, since the decoder cannot control which of the possible output symbols are going to be received at the decoder, some transmissions of K+a output symbols will include more output symbols than needed and some transmissions of K+a output symbols might not be enough to decode all of the input symbols, in which case the decoder would take additional output symbols from the channel to complete the decoding process.

In a most general case, the "associates" of an output symbol, i.e., the input symbols that are in the list AL(I) for a given output symbol in the above example, are selected from the entire set of input symbols. Thus, an efficient encoder would likely store all the input symbols in local memory for quick access as needed to generate output symbols. As used herein, memory is considered local or remote, with local memory being differentiated from remote memory not necessarily in its location, but in its response time and ease of access. For example, a computer system might have a 512 kilobyte (KB) processor cache, a 128 megabyte (MB) RAM memory (random access memory), and a 2 gigabyte (GB) disk drive. Assuming that the time the processor needs to access the processor cache is much less than the time it needs to access the RAM and the RAM access time is much less than the time it needs to access the disk drive, the processor cache would be local memory relative to the remote memory of the RAM and the RAM would be local memory relative to the remote memory of the disk drive.

In optimizing a processing system for performance, one considers the use of local memory and remote memory. If a process is changed from one that uses only remote memory or remote and local memory to one that uses only local memory or a higher proportion of local memory over remote memory, the process will end up being more efficient. One constraint that prevents many processes from using local and remote memory more efficiently is the memory needs of the process and the sizes of the memories. For example, where 1 GB is needed to store data, in the above-described processing system, at least some of the data will have to be stored on the disk drive.

In the case of a chain reaction coding system, if the input file requires 1 GB for storage, the above-described processing system would either have to quickly process data from the disk drive, or be modified to include 1 GB of RAM. In many cases, enlarging a more local memory to avoid the use of a more remote memory is not an economical proposition.

SUMMARY OF THE INVENTION

In one embodiment of a chain reaction coding system according to the present invention, a window is used in the selection of associates, resulting in localization of activity when generating output symbols and recovering input symbols, thereby allowing for more frequent use of a limited local memory instead of more frequent use of a remote memory.

One advantage of the present invention is that it allows for a more efficient encoder and decoder that can take advantage of the locality of the input symbols. One benefit of locality is that a subset of the input file can be stored in a fast memory, such as a processor cache, and the fast memory can be smaller than the entire file. Another benefit of locality is that a change to a local area of the input file will only affect a local area of output symbols. Locality may be relative, in that the encoding and decoding might be taking place on a subset that comprises a set of input symbols that are not necessarily contiguous in the input file as stored.

A further understanding of the nature and the advantages of the inventions disclosed herein may be realized by reference to the remaining portions of the specification and the attached drawings.

DESCRIPTION OF THE SPECIFIC EMBODIMENTS

Luby I and Luby II describe various chain reaction coding systems in detail. As described therein, a chain reaction encoder generates output symbols from input symbols of the input file as needed. Luby I/II define and describe various concepts relating to chain reaction coding and group chain reaction coding, and those teachings are incorporated by reference herein rather than restating them here in their entirety. Generally speaking, Luby I/II teach how to make and use a chain reaction coding encoder and decoder to transport data, including a process for generating an output symbol or a group of output symbols from selected input symbols.

Figure 1:
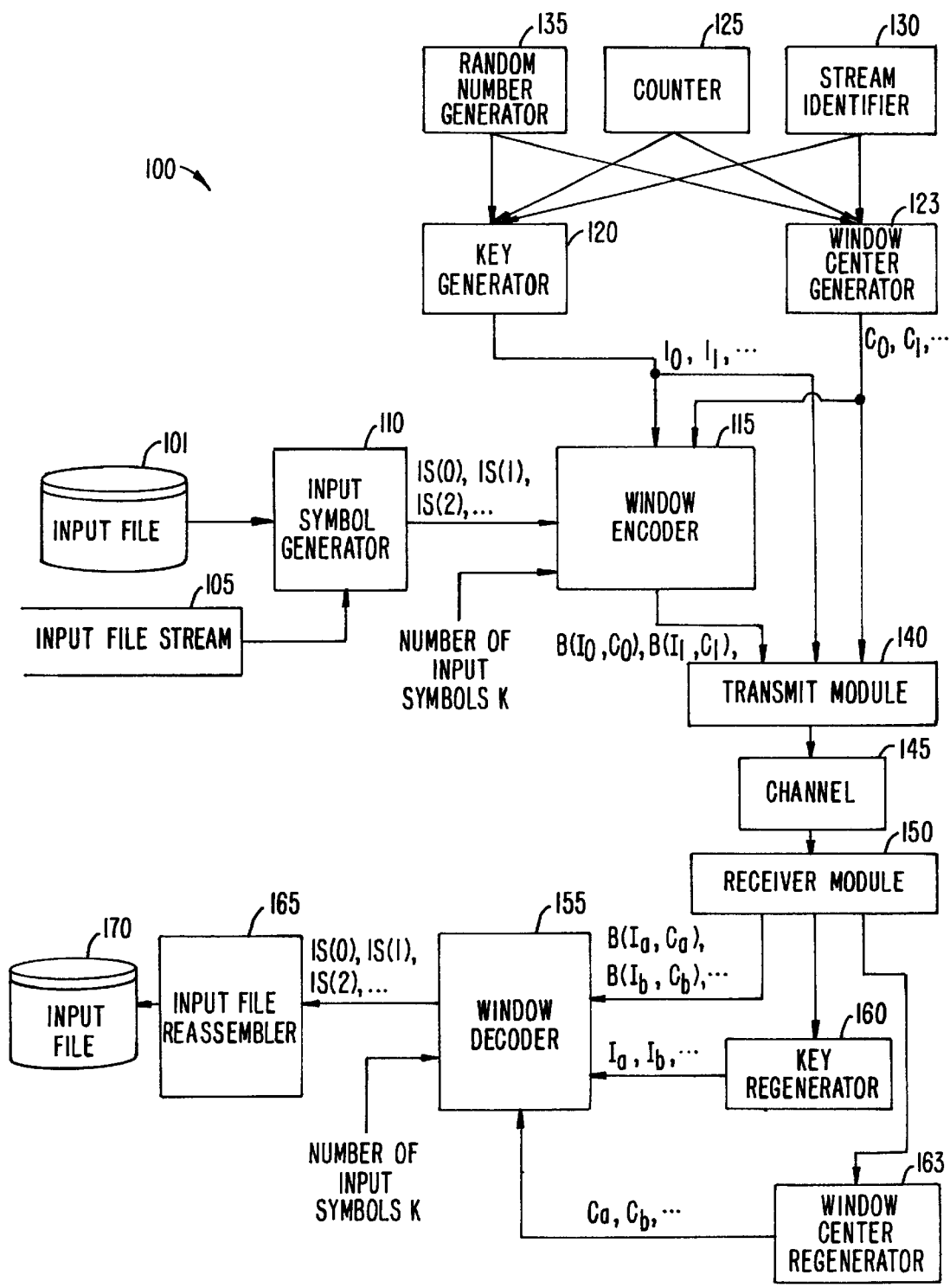
FIG. 1 is a block diagram of a communications system according to one embodiment of the present invention.

FIG. 1 illustrates such a system. FIG. 1 is a block diagram of a communications system 100 that uses chain reaction coding with window encoding. In communications system 100, an input file 101, or an input stream 105, is provided to an input symbol generator 110. Input symbol generator 110 generates a sequence of one or more input symbols (IS(0), IS(1), IS(2), . . . ) from the input file or stream, with each input symbol having a value and a position (denoted in FIG. 1 as a parenthesized integer). The output of input symbol generator 110 is provided to a window encoder 115.

Window center generator 123 generates a window center for each output symbol to be generated by window encoder 115. Window center generator 123 might use a combination of the output of a counter 125, a unique stream identifier 130, and/or the output of a random number generator 135 to produce each window center. The output of window center generator 123 is provided to window encoder 115 and to a transmit modulel 40.

Key generator 120 generates a key for each output symbol to be generated by window encoder 115. Key generator 120 might use a combination of the output of counter 125, unique stream identifier 130, and/or the output of random number generator 135 to produce each key. The output of key generator 120 is provided to window encoder 115 and to transmit module 140. From each key I provided by key generator 120 and window center C provided by window center generator 123, window encoder 115 generates an output symbol, with a value B(I, C), from the input symbols provided by the input symbol generator. The value of each output symbol is generated based on its key, its window center and on some function of one or more of the input symbols, referred to herein as the output symbol's "associated input symbols" or just its "associates".

The selection of the function (the "value function") and the associates is done according to a process described in more detail below and for the window encoder, the selection of associates is performed among a subset of input symbols. While a subset can be used that is not entirely contiguous, the examples herein typically use a subset that is a "window", i.e., a contiguous set of input symbols that includes all of the input symbols that fall within the window's bounds. For each window, a window can usually be entirely defined by its center and its size (i.e., the number of input symbols that fit within the window). Furthermore, while the examples typically assume that the subset or window is the same size for all output symbols, it should be understood that the size of the subset could be different for different output symbols. For example, a proper subset of a small portion of the input file might be used for most of the output symbols and then, for others of the output symbols, a subset that includes all of the input symbols in the input file might be used.

In some embodiments, the number K of input symbols is used by the encoder to select the associates. If K is not known in advance, such as where the input is a streaming file, K can be just an estimate. The value K might also be used by window encoder 115 to allocate storage for input symbols. Window encoder 115 provides output symbols to a transmit module 140. Transmit module 140 is also provided the key of each such output symbol from the key generator 120 and with the window center of each such output symbol from the window center generator 123. Transmit module 140 transmits the output symbols, and depending on the keying method used, transmit module 140 might also transmit some data about the keys and window centers of the transmitted output symbols, over a channel 145 to a receiver module 150. As explained below, transmit module 140 might include a buffer to store output symbols, thereby allowing transmit module 140 to transmit output symbols in an order that is different from the order in which transmit module 140 receives the output symbols.

Receiver module 150 provides the output symbols to a decoder 155, any data receiver module 150 receives about the keys of these output symbols is provided to a key regenerator 160, and any data receiver module 150 receives about window centers is provided to a window center regenerator 163.

Key regenerator 160 regenerates the keys for the received output symbols and provides these keys to decoder 155. Window center regenerator 163 regenerates the window centers for the received output symbols and provides these centers to decoder 155. Decoder 155 uses the keys provided by key regenerator 160, the window centers provided by window center regenerator 163, and the corresponding output symbols, to recover the input symbols (again IS(0), IS(1), IS(2), . . . ). Decoder 155 provides the recovered input symbols to an input file reassembler 165, which generates a copy 170 of input file 101 or input stream 105.

Figure 2:
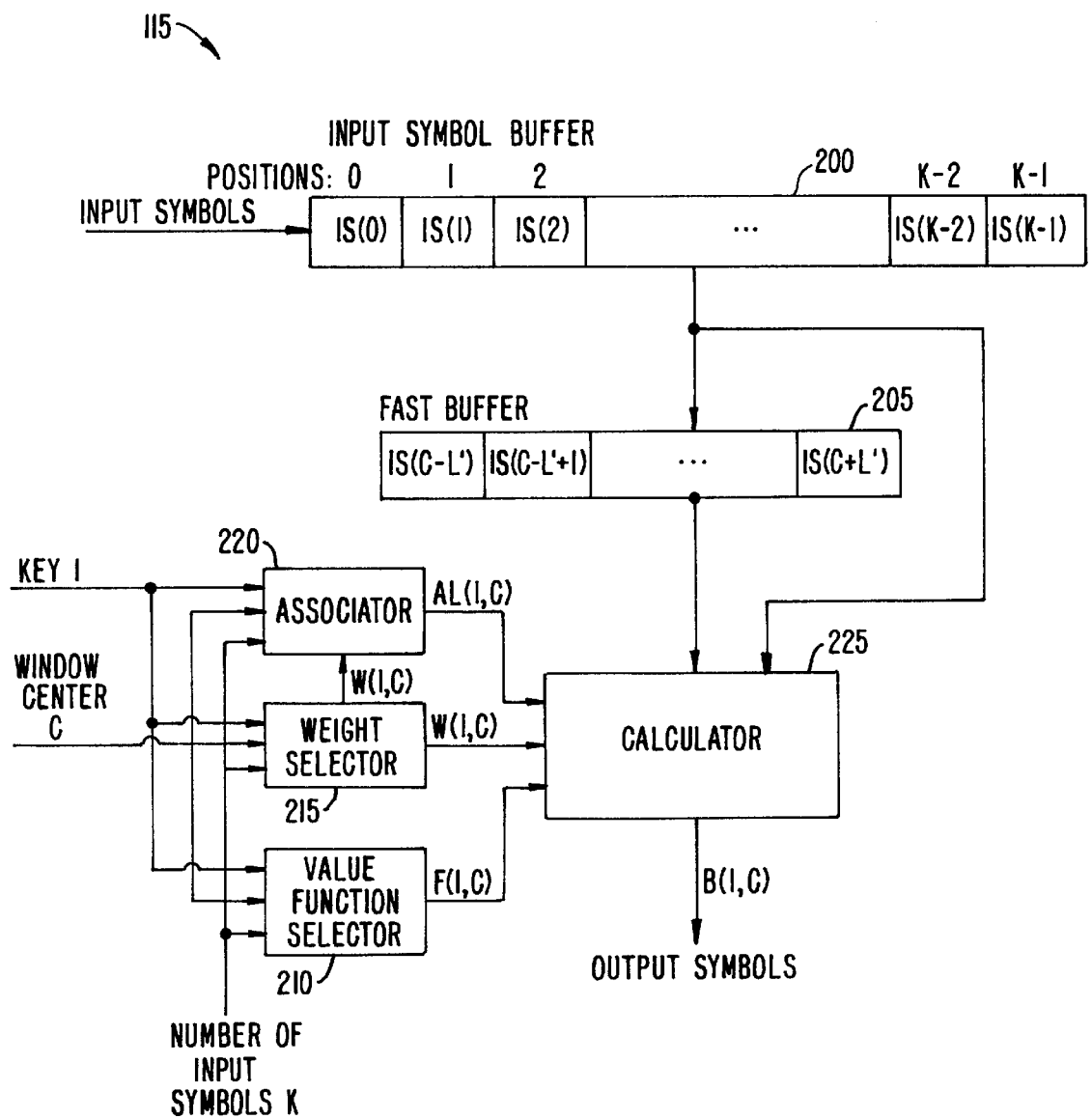
FIG. 2 is a block diagram showing the encoder of FIG. 1 in greater detail.
Figure 3:
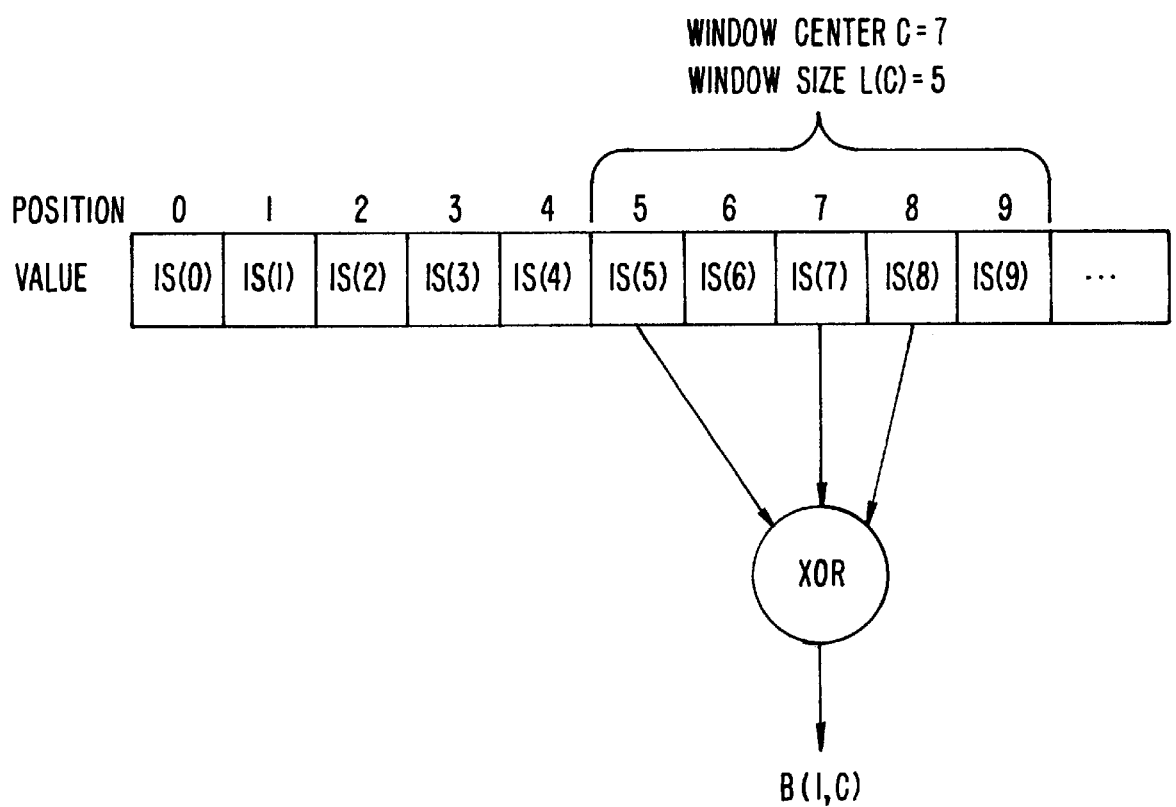
FIG. 3 is an illustration of how an output symbol might be generated from a set of associated input symbols where the associated input symbols all fall within a window centered on an input symbol at position C with a window size of L(C).

FIG. 2 is a block diagram of one embodiment of window encoder 115 shown in FIG. 1. The block diagram of FIG. 2 is explained herein with references to FIG. 3, which is a diagram showing the logical equivalent of some of the processing performed by the encoder shown in FIG. 2.

Window encoder 115 is provided with input symbols from a fast buffer 205 and input symbol buffer 200 and a key and a window center for each output symbol it is to generate. As shown, L(C) input symbols in order of position are stored in fast buffer 205, where L(C) is the window size currently in use and C is the center of the window and where L'=(L(C)−1)/2 for odd values of L(C) and L'=L(C)/2 for even values of L(C). For simplicity in the figure, L(C) is assumed to be odd; L(C) could be even or odd and where L(C) is even, the last symbol of fast buffer 205 might be IS(C+L'−1) instead of IS(C+L') as shown in FIG. 2. Also, while the size L of the window is expressed here as a function of the window center, C, it should be understood that in some variations, L is fully determinable from the window center C while on other variations L is a function of other values as well or is independent of C. However, for clarity of the explanation, the description below assumes that L is fully determinable from C unless otherwise indicated.

Nothing about the invention requires that the size of fast buffer 205 be equal to the window size, as fast buffer 205 could be larger or smaller than the window size. Furthermore, fast buffer 205 need not contain all of the input symbols in the window, even if fast buffer 205 is larger than the size of the window. Thus, some or all the input symbols can be read as needed from storage containing the entire input file. In a preferred embodiment, however, fast buffer 205 would be a storage medium with a faster access time than input symbol buffer 200. For example, fast buffer 205 might be implemented in a processor cache while input symbol buffer 200 is stored in its entirety in RAM or disk storage. Thus, it is preferable that as many as possible of the input symbols are in fast buffer 205 when the calculator 225 is invoked, balancing the time savings of invoking the calculator 225 when many symbols are in fast buffer 205 with the time it takes to move input symbols from the buffer 200 to fast buffer 205.

Key I (provided by key generator 120 shown in FIG. 1) and window center C (provided by window center generator 123 also shown in FIG. 1) are inputs to value function selector 210, weight selector 215 and associator 220. The number of input symbols K is also provided to these three components 210, 215 and 220. A calculator 225 is coupled to receive outputs from value function selector 210, weight selector 215, associator 220, input symbol buffer 200 and the fast buffer 205, and has an output for output symbol values. It should be understood that other equivalent arrangements to the elements shown in FIG. 2 might be used, and that this is but one example of an encoder according to the present invention.

Using I, C, and possibly K, weight selector 215 determines the number W(I,C) of input symbols that are to be "associates" of the output symbol having key I. In one variation, W(I,C) is chosen based only on I and does not use C. Once the number W(I,C) is determined, weight selector 215 supplies the number to calculator 225 and to associator 220 if needed.

Using C, the associator 220 determines the size L(C) of the window centered at C in the file that the positions of the input symbols are to be selected from. It should be understood that L(C) might be the same for all output symbols produced, i.e., for all values of C, L(C) could be the same. Then, using I, C, L(C), W(I,C) and possibly K, associator 220 determines a list AL(I,C) of positions of input symbols selected among the L(C) symbols in positions centered at C in the original list of input symbols, computed by accessing the input symbol buffer 200 and fast buffer 205. It should be understood that W(I,C) need not be separately or explicitly calculated if associator 220 can generate AL(I,C) without knowing W(I,C) ahead of time. Once AL(I,C) is generated, W(I,C) can be easily determined because it is the number of associates in AL(I,C). It should also be understood that fast buffer 205 does not have to have the same size as the window, and that not all the input symbols used by the calculator need be in fast buffer 205, as some or all of the input symbols may be obtained from input symbol buffer 200. Preferably, the window is not larger than fast buffer 205, and as many input symbols as possible can be obtained from the fast buffer 205, but the window might have a variable size that is sometimes less than the fast buffer size, or can have a constant size less than the fast buffer size.

Once I, W(I,C) and AL(I,C) are known and available to calculator 225, then calculator 225 calculates the value B(I,C) of the output symbol being calculated based on a value function F(I,C), if a variable value function is used. One property of a suitable value function is that it would allow the value for an associate in AL(I,C) to be determined from output symbol value B(I,C) and from the values for the other W(I,C)−1 associates in AL(I,C). One preferred value function used in this step is the XOR value function, since it satisfies this property, is easily computed and easily inverted. However, other suitable value functions might be used instead.

If used, value function selector 210 determines a value function F(I,C) from key I, K, and possibly C. In one variation, the value function F(I,C) is the same value function F for all I and C. In that variation, value function selector 210 is not needed and calculator 225 can be configured with the value function F. For example, the value function might be XOR for all I, i.e., the output symbol value is an XOR (exclusive OR) of the values of all of its associates.

For each key I and window center C, weight selector 215 determines a weight W(I,C) from I, C and K. In one variation, weight selector 215 selects W(I,C) by using the key I to first generate a random looking number and then uses this number to look up the value of W(I,C) in a distribution table that is stored within weight selector 215. In some variations the distribution table may depend on C, and in other variations there is only one distribution table for all values of C. Once weight selector 215 determines W(I,C), this value is provided to associator 220 and to calculator 225.

The associator 220 may first compute the size L(C) of the window centered at C in the file that the positions of the input symbols are to be selected from, if the window size varies depending on C. Associator 220 determines a list AL(I,C) of the positions of the W(I,C) input symbols to be associated with the current output symbol. The association is based on the value of I, on the value of C, on the value of W(I,C) and possibly L(C) and K (if available). Once associator 220 determines AL(I,C), AL(I,C) is provided to calculator 225. Using list AL(I,C), weight W(I,C) and either the value function F(I,C) provided by value function selector 210 or a preselected value function F, calculator 225 accesses the W(I,C) input symbols referenced by AL(I,C) in fast buffer 205, or in input symbol buffer 200 if the needed input symbols are not present in fast buffer 205, to calculate the value, B(I,C), for the current output symbol.

Window encoder 115 then outputs B(I,C). In effect, window encoder 115 performs the action illustrated in FIG. 3, namely, to generate an output symbol value B(I,C) as some value function of selected input symbols. In the example shown, the value function is XOR, the weight W(I,C) of the output symbol is 3, the center of the window is 7, the size L(C) of the window is 5, the associated input symbols (the associates) are at positions 5, 7, and 8 and have respective values IS(5), IS(7) and IS(8). Thus, the output symbol is calculated as B(I,C)=IS(5) XOR IS(7) XOR IS(8) for that value of I and C.

Figure 4:
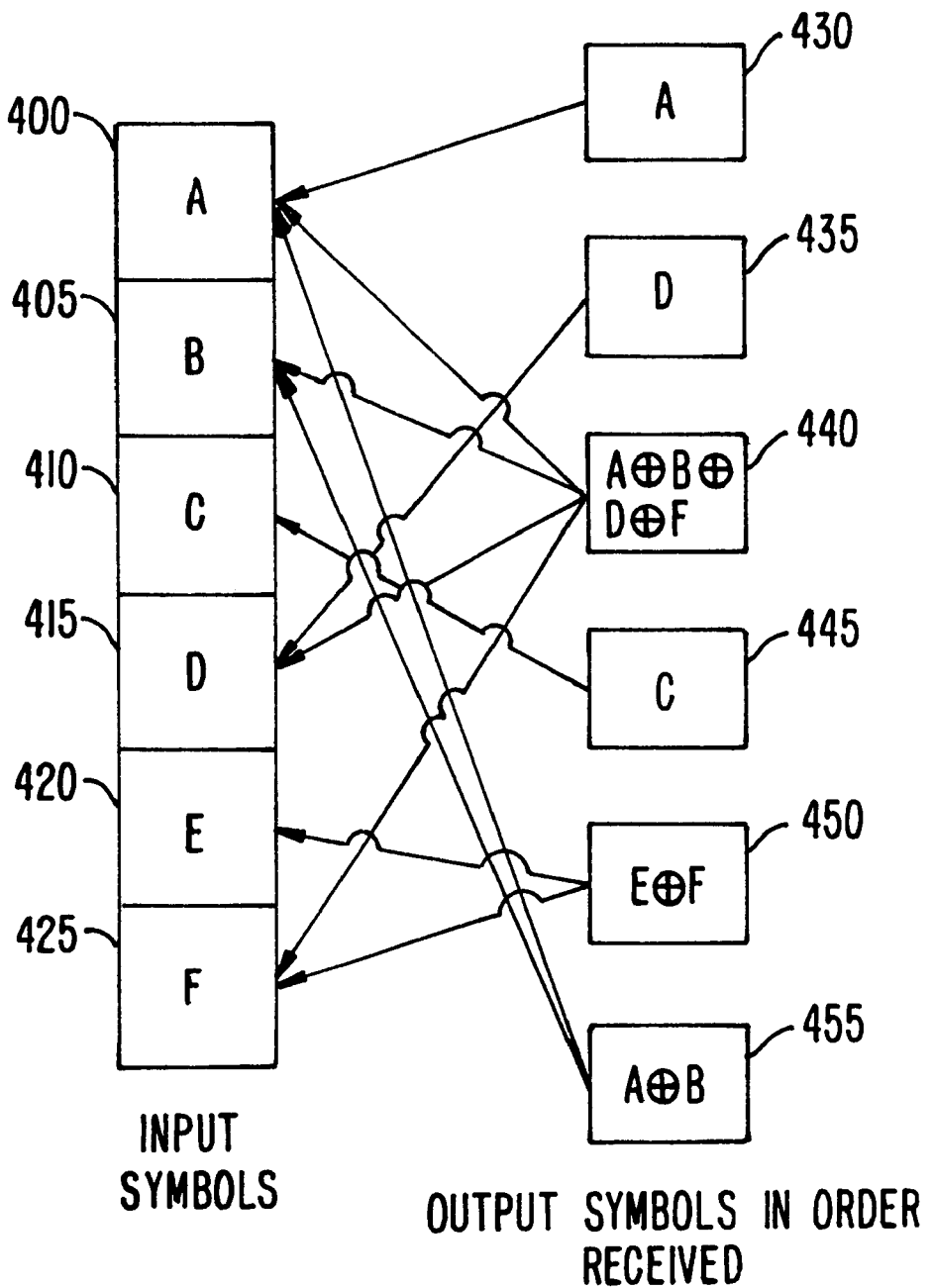
FIG. 4 is an illustration of how input symbols might be recovered from output symbols.

The generated output symbols are then provided to transmit module 140, which may reorder the output symbols so that if a burst of output symbols are lost, they are not all generated using the same or overlapping windows. Once received by receiver module 150, the output symbols are provided to a decoder 155, which might decode input symbols as shown in FIG. 4. In FIG. 4, output symbols with values A (430), D (435), C(445), A XOR B (455), A XOR B XOR D XOR F (440) and E XOR F (450) have been used to recover input symbols A (400), D(415), C (410), B(405), F(425) and E(420), in that order.

Figure 5:
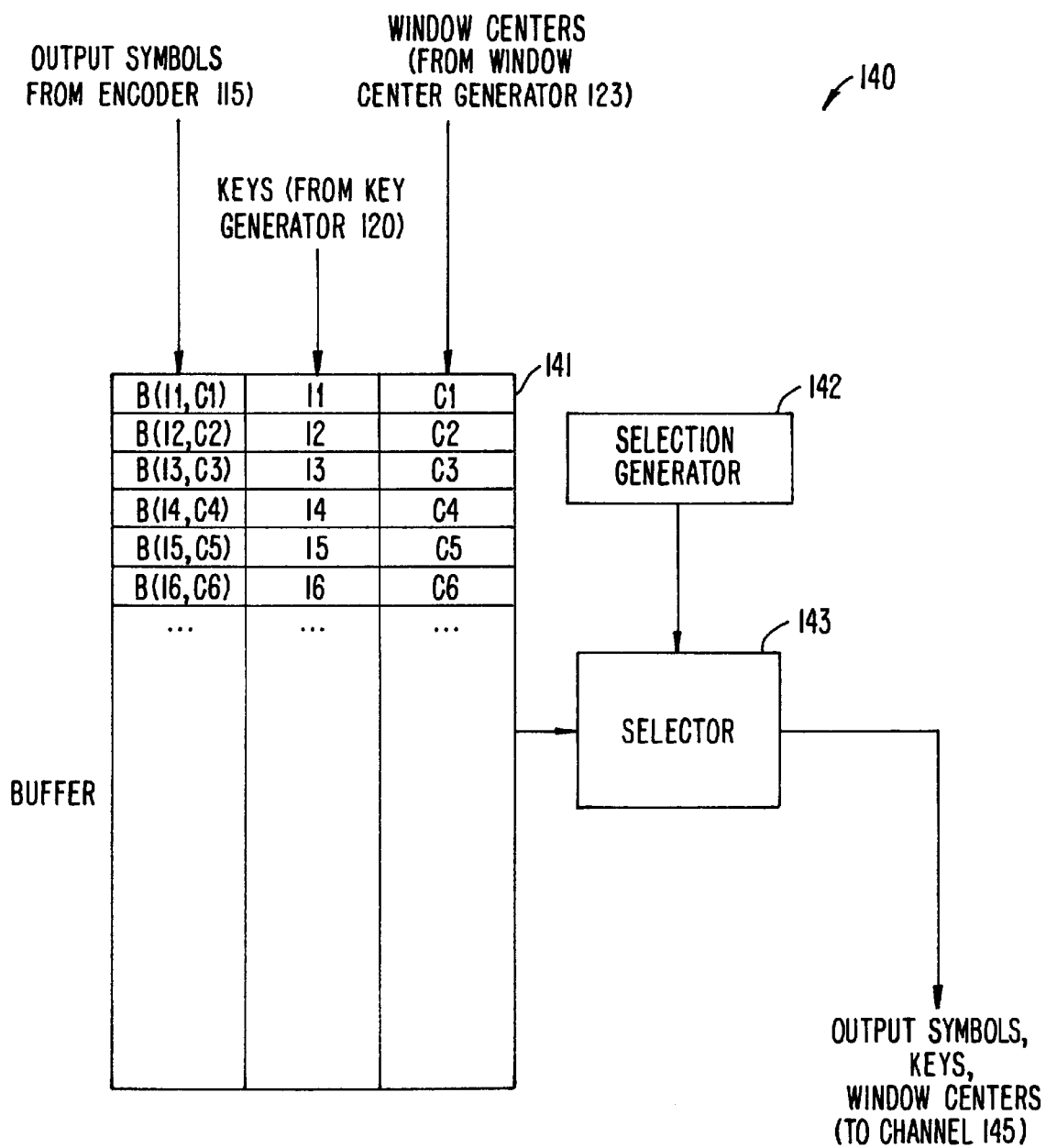
FIG. 5 is a block diagram showing the transmit module of FIG. 1 in greater detail.

FIG. 5 is a block diagram showing the transmit module 140 of FIG. 1 in greater detail. As shown there, the output symbols, keys, and window centers are stored in a buffer 141 and extracted from the buffer according to selection values provided from a selection generator 142 to a selector 143. The extracted output symbols, keys and window centers are then applied to the channel. Further details of reordering are set forth below.

In the basic system described above, if the window size is set to the number K of input symbols in the file, then any input symbol in the input file might be called up to be an associate of a given output symbol, which means that either the local memory needs to be as large as the input file or an encoding process will need to make frequent reads from the remote memory. In the variations described below, the associates of an output symbol are not distributed over the entire input file, but fit within some window into the input file that is smaller than the whole input file. Preferably, the size of the window is such that all of the input symbols in the window can fit into the local memory. If the input symbols in the window are stored in local memory, calls to the remote memory are not needed, or at the very least minimized, except possibly when the window moves.

As described below, there are several variations on the rule that applies to move the window. For example, with a nonoverlapping, "blocking" window, the window remains in place until a certain number of output symbols have been generated, and then the window moves to cover a set of non-overlapping input symbols that have no members in common with the members of the prior window. Overlapping windows might be windows that "slide" over the input file as output symbols are generated, including a "tailbiting" window that slides over the input file and loops back to sometimes cover input symbols at the end of the input file and input symbols at the start of the input file.

In a preferred embodiment, the output symbols generated from an encoder that uses a window are transmitted in an order wherein nearby output symbols do not necessarily relate to nearby input symbols, to avoid a result where gaps or losses in the output symbol stream over the channel result in gaps or unrecoverable portions in the input symbol information. One method of creating such an effect is to move the window over the input file in sequence, cache the resulting output symbols and then reorder the output symbols prior to placing them in the channel. The reordering can occur using a pseudorandom sequence. Another method is to move the window around the input file in a nonsequential manner (such as pseudorandomly positioning the window around the input file) and sending output symbols to the channel in the order they are generated.

As used in many of the below examples, the input symbols that fall within a "window" of the input file are a contiguous subset of less than all of the input symbols in the input file. However, it should be understood that a system according to the present invention might not be so limited. For example, in a system where the window size is 1,000 input symbols, the window would cover only a small portion of an input file of one million input symbols, but if an input file of 500 input symbols were processed by the same system, the window would cover the entire file, albeit without some of the benefits that windowing provides when larger files are processed.

Also, "contiguous" might be a relative term in some systems. For example, if the input symbols in an input file each have an cardinal number identifying its position within the file (i.e., first symbol, second symbol, etc.), but the symbols are stored on a hard drive in some other order (as might be the case with a highly fragmented, sector-based storage device), the contiguity of the symbols might be determined by some other value associated with the input symbols other than the cardinal number such as, for example, its location on the storage device. Of course, if a decoder is to benefit from more cache use due to windowing, the order used should be something that the decoder can derive and use to set the order in which input symbols are recovered.

With the above in mind, the examples herein will assume, for simplicity of explanation, that the input symbols have some order that is determinable at the encoder and at the decoder, that the window defines a subset of the input symbols that is contiguous with respect to that order, and that the window defines less than all of the input symbols.

There are many reasons for windowing the input file. One reason is the reason described above concerning local memory and remote memory. Management of local memory and remote memory is well-known in the field of cache theory and so it need not be described here in detail, except to note that windowing improves the cache hit vs. cache miss ratio of a cache architecture.

Another reason for windowing is that an encoder can start the encoding process even if the input file does not entirely exist or is not entirely available to the encoder, by the encoder beginning an encoding process when a window's worth of input symbols is available. With windowing, output symbols do not depend on the values of input symbols outside the window, so those output symbols can be generated even before input symbols outside the window are available. Similar benefits would be available to the decoder, in that the decoder may be able to start decoding before the entire file is received. This is especially desirable for both real time and archival streaming media.

Yet another reason is that local changes in the input file will result in only local changes in the output symbols. Thus, if some input symbols change in a local area of the input file, the only output symbols that are affected and possibly need to be changed are those output symbols generated from windows that include the changed input symbols. This would make updating a distributed data storage system far more simple and efficient.

The following disclosure will generally follow with a description of a blocking window scheme with fixed, non-overlapping windows that divides the input file into disjoint blocks, followed by a description of a sliding window scheme that moves a window across the input file as the encoder/decoder processes symbols. Further below, a window encoder is described, including a practical encoder for two variations of sliding window schemes. Following that, the disclosure describes the use of selected heuristics to speed up the decoding process, an example of a "Soliton" distribution (Soliton distribution refers to distributions on weights of output symbols that are similar to those that can be found in Appendix A of Luby I) for a window, some experimental results and finally some additional applications of window schemes.

As used herein, the "size" of an object, such as a file, a window, a block, memory or cache, should be taken to mean the number of symbols in the object, whereas the "length" of the object refers to number of bytes needed to store the object. The length of an object is equal to its size multiplied by the length of a symbol. The symbol length could be a single bit or 1,000 bytes or more.

In selecting a symbol length, a symbol length that is a multiple of the word length of the processor performing encoding or decoding, or the word length of data processed by the encoder, is more efficient than some other symbol length. For example, if the function that relates input symbols to an output symbol is the XOR function, or similar function, and the encoder is implemented using a processor that processes data in 32-bit words, then 32 bits would be a good choice for symbol length. In the Pentium™ family of microprocessors manufactured by Intel, the word length is four bytes (32 bits).

Of course, the symbol length can be some multiple of the processor word length. Generally, XOR operations become more efficient as symbol length increases up to 64 bytes, and then further increases in efficiency are usually not realized (but there is no decrease in efficiency for larger symbol lengths). There is a tradeoff associated with picking the symbol length if the file length is fixed, as a larger symbol length decreases the number of input symbols in the input file and increases the memory needed to hold a certain number of symbols in memory at once.

A Blocking Scheme

Figure 6:
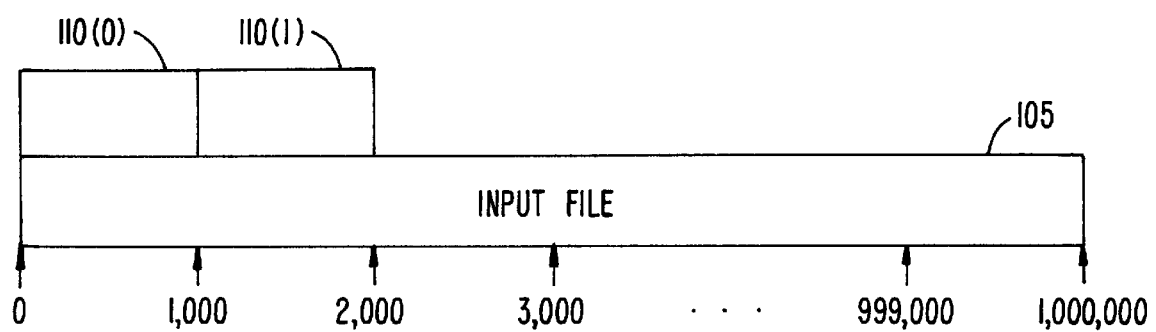
FIG. 6 is an illustration of how a blocking window encoder might operate.

A blocking window scheme will now be described with reference to FIG. 6 and an encoder using that scheme. As shown there, an input file 105 of one million symbols is to be processed with a 1,000 symbol window 110. A first instance 110(0) of window 110 covers input symbols from 0 to 999 and once the encoder processes those input symbols, a second instance 110(1) of window 110 is used. This continues for 1,000 instances of the window, and repeats if additional output symbols are needed. As shown in FIG. 6, the input file is broken up into smaller disjoint blocks. Each block can be encoded and decoded separately using the chain reaction encoder and chain reaction decoder, respectively. "Chain reaction encoder" and "chain reaction decoder" refer to generally to embodiments of the chain reaction encoders/decoders described in Luby I/Luby II.

In a packet-switched network, the encoder might randomly select a block, or a subset of blocks, and send an output symbol from each chosen block in the packet. It should be understood that where a random action is described herein, such as a random selection of a block, a pseudorandom action might be an equivalent, as is often the case when an action needs to have somewhat of a random-appearing outcome.

The blocking scheme has both advantages and disadvantages. Each block is disjoint from the rest of the file, so the block can be encoded or decoded independently, and in parallel if desired. Because of this, the length and/or size of the blocks might vary or different blocks might be transmitted over different independent channels. Also where the input file is stored in a slower memory and the window is copied to a faster memory, the encoding and decoding processes are much faster than encoding over the entire file. Transmitting each block over a separate channel allows a receiver to download the blocks in order and start decoding from the beginning of the file while other blocks are still arriving.

On the other hand, one disadvantage of the blocking scheme is the size of the window needed to avoid a large reception overhead, as explained below. As taught in Luby I/Luby II, where the size of the input file is K and K' symbols (K'=K+a) are needed to decode the entire file in most cases, the reception overhead is a/K when no windowing is used. Borrowing the analysis of estimates for a in Luby I/Luby II for chain reaction codes, given a file with K symbols, the reception overhead required to successfully decode (nearly all the time) is $c/\sqrt{K}$, where in the worst case the constant c is typically 11 or 12. For instance, for K=100,000, the reception overhead is about 3.5%, and when K=1,000,000 the reception overhead is about 1%. When the input file is broken into b equal length non-overlapping blocks of size L, the reception overhead is at least the reception overhead of a single block, i.e., at least $c/\sqrt{L}$. Thus the reception overhead when using the blocking scheme increases by at least a factor of $\sqrt{K/L}=\sqrt{b}$ over a scheme that uses no windows. For example, for K=1,000,000 and b=1,000, this window blocking scheme has reception overhead of about 35% versus about 1% when no windowing is used. That estimate of reception overhead is optimistic for the non-overlapping window blocking scheme, because a file divided into blocks that are sent separately across a channel will incur an additional reception overhead caused when the decoder has to wait for enough output symbols to arrive for each block to be able to decode.

A typical processor cache of 512 KB is large enough to contain about 8,000 64-byte input symbols, in which case a value of 8,000 for L would be a suitable value. However, with L=8,000, the reception overhead for a block of 8,000 input symbols is around 12% so the blocks would have to be larger than a typical processor cache to maintain a low reception overhead of around 3 or 4%. The increase in the overhead is a disadvantage of the blocking scheme, but in some applications, the benefits of the blocking scheme outweigh the disadvantages.

Sliding Window Schemes

Instead of dividing the input file into disjoint blocks, the encoder (or decoder) can use a window that overlaps other windows, e.g., "sliding" a window across the input file. The sliding window tends to eliminate artificial boundaries imposed by the blocking scheme and does not require that each block has enough output symbols to decode all the input symbols in that block. Without the overlap, output symbols from one block are not helpful in decoding input symbols from another block. With the overlap, an output symbol generated with one window might allow for the decoding of an input symbol from another, overlapping window, which might in turn allow for the decoding of an input symbol in yet another window, and so on.

Experimental results indicate that decoding an input file that is encoded using a sliding window of moderate size can be done with a reception overhead that is similar to that of encoding over the whole file (i.e., without a window), whereas encoding over b disjoint, equal length blocks requires a reception overhead that is a factor $\sqrt{b}$ times greater than encoding over the whole file. This fact allows smaller sliding windows relative to the window/block sizes used with the blocking scheme to obtain a given reception overhead. This reduces the memory requirements and makes it much more likely that good caching performance can be had.

A Tail-Biting Window and a One-Pass Window

In this section, two variations of a sliding window scheme are considered, which are denoted here as the "tail-biting" window scheme and the one-pass window schemes. One difference between the two is how a window behaves near the ends of a file, when the window is such that part of the window extends past an edge (either the beginning or the end) of the file. In the tail-biting window scheme, when the window extends past an edge of the file, it wraps around to include input symbols at the other edge of the file. In the one-pass window scheme, a window does not pass beyond an edge of the file. Thus, in a one-pass window scheme, there are no output symbols with associates at both ends of the input file.

With the tail-biting window scheme, since some output symbols have associates at both ends of the input file, the decoder might find it difficult to decode the input file from beginning to end in one pass without incurring a prohibitive reception overhead, since some input symbols at the beginning of the input file might only be recoverable using output symbols that have associated input symbols from the end of the input file. For a tail-biting window, experiments indicate that in order to decode the file with low overhead, the decoder has to make several passes over the file.

On the other hand, a one-pass window encoder does not generate output symbols that depend on input symbols at both edges of the input file, so it is far easier to decode the file from beginning to end in one pass. Of course, it is still possible that an output symbol with a window near the end of the file may trigger a chain reaction of input symbols being recovered, resulting in the recovery of an input symbol near the beginning of the file that could not otherwise be recovered. However, some experimental results show that, at any point in decoding, the difference between the highest input symbol position decoded and the lowest input symbol position not decoded, or the "decoding spread", is less than five window sizes 95% of the time, for a file size K=100,000 and a window size L=5,000.

Selecting a Window Size

There are various ways to choose the size of a window. The size could be a function of the input file size, the window's position in the input file, the probability of having a window located at a window's position, or the number of associates of the output symbol being generated. In a simple case, the window size is independent of the input file size, except that the window size is smaller than the file size, and except when the window is near either edge of the file. Preferably, the window size is selected such that the maximum window size is large enough, relative to the file size, that the choice of encoding symbol weight distribution based on the file size can be effectively represented in the window. In particular, if the window size is too small relative to the weight distribution chosen based on the file size, then it is not possible to create output symbols that have high weight, i.e., output symbols that have a large number of distinct neighboring input symbols all contained within a window, as might be required by a particular weight distribution.

Thus, if the chosen window size is too small, then the Soliton distribution restricted to that window size will not reflect the characteristics of a distribution chosen over the whole file, resulting in a higher reception overhead. In the extreme case of a window size of one, then each output symbol represents one input symbol and the reception overhead for a file of size K is proportional to log K instead of $1/\sqrt{K}$.

Order of Window Traversal

Since a window scheme generates an output symbol from a limited subset of input symbols, each input symbol must be covered at least once by the window if it is to be recovered at the decoder. Further, since the window is smaller than the input file (except in the degenerate case), the window must "move" over the input file. With the blocking scheme, the window is stationary for some number of output symbols, then jumps to a new, nonoverlapping position, as illustrated in FIG. 6. With some sliding window schemes, the window might move after some number of output symbols are generated, or the window might move after each output symbol is generated.

In the basic sliding window scheme, the window moves from the beginning of the file to the end of the file and moves one input symbol closer to the end of the file after each output symbol is generated. In any case, the window of an output symbol, i.e., the window in place when that output symbol was generated, should be such that the windows are well distributed over the output symbols that are passing through the channel or channels between the encoder and decoder, so that a sustained loss in the channel does not cause the loss of some local area of the input file.

In particular, the desired property of a probability distribution, WCD, on window centers is the following. Suppose a stream of output symbols are generated by independently choosing a window center at random according to WCD and then generating the next output symbol in the stream randomly with this window center. Then, for any pattern of loss, the distribution on the number of output symbols needed to recover the file is the same. Thus, if the stream of output symbols between the encoder and decoder were examined, the position of the window from output symbol to output symbol might appear to be randomly distributed according to WCD over the input file.

This "random window" effect can be implemented by randomly jumping the window around the input file according to the window center distribution WCD, but then the caching benefits of the window scheme might be lost. Instead, sliding window with buffering as described here is a preferred approach. Generally speaking, a sliding window with buffering generates a buffer of output symbols in an order such that consecutively generated output symbols have window centers that are near one another, and then the output symbols are randomly reordered in the buffer before transmission so that they are transmitted in an order where the output symbol centers are randomly distributed according to WCD. Using this approach, the caching benefits of the window scheme are realized in the generation step, and the randomness of the output symbols transmitted are realized by randomly reordering the output symbols before transmission step.

Consider the performance of an encoder, i.e., the rate (in megabits per second, or "Mbps") at which the encoder can generate output symbols for transmission across the channel multiplied by the output symbol length. Similarly, consider the performance of a decoder, i.e., the rate at which the decoder can decode an input file (also measured in Mbps). An encoder or decoder that uses a sliding window with buffering results in better encoder and decoder performance than randomly jumping the window about the input file, as the former takes advantage of the locality of the window, while the latter does not.

To produce output symbols with the correct overall distribution, the output symbols sent to the channel should have their window centers distributed randomly according to the correct window center distribution WCD. For example, for the non-overlapping blocking scheme, the WCD distribution is such that window centers are uniformly distributed among the b centers of blocks that the file is partitioned into. To generate output symbols sent to the channel with window centers distributed according to the WCD that is correct for the non-overlapping blocking scheme, the encoder could generate and place into a buffer a number of output symbols from the first block with a window center in the middle of this block, and then an equal number of output symbols from the second block with window center in the middle of the second block, and so on for all b blocks. Then, all the output symbols in the buffer could be permuted into a random order before transmission to ensure that the output symbols sent to the channel have window centers distributed according to WCD. In general, the encoder could perform a complete pass of the sliding window over the file to fill a buffer so that when the output symbols in the buffer are randomly permuted and sent to the channel the window centers of the output symbols sent to the channel are distributed according to WCD for the appropriate window center distribution WCD.

To generate output symbols in a sliding window order and send them out in random order (window centers distributed according to the correct WCD distribution), the sliding window encoder may need to buffer a number of output symbols that is proportional to the number of symbols generated in one period, where a "period" is the time it takes for the encoder to complete pass of the sliding window over the file to generate the buffer of output symbols. FIG. 5 shows how this works. A period of output symbols are stored into buffer 141 as they are generated. Once a period of output symbols has been generated, selection generator 142 feeds information about the WCD distribution to selector 143, and selector 143 selects the output symbols in buffer 141 in an order that is consistent with WCD for transmission to the channel 145.

One advantage of generating output symbols using a sliding window is that, because of the locality of the centers of the output symbols during the generation of the output symbols, the encoding process is more efficient as described above. One rationale for randomly permuting the output symbols before sending them to the channel is that this ensures that they are distributed in a way that makes the transmission more robust to different types of channel packet loss.

An Implementation of a Window Encoder

A detailed implementation of a window encoder and its effects will now be described. Some of the effects of a window encoder can be best understood by analyzing the effects of a chain reaction encoder and modifying the analysis to account for a window. Such an analysis is presented below, followed by an instance of a more practical implementation of a window encoder for either the tail-biting or one-pass windowing schemes.

Consider a file partitioned into K equal length segments, called input symbols. Label the input symbols $IS(0), \ldots, IS(K-1)$, where the index indicates the position of the symbol in the file. When an output symbol is to be computed, the encoder chooses a window center C and a window size $L=L(C)$. For simplicity, assume L is odd and define $L'=(L-1)/2$. Then, the window covers the input symbols $IS(C-L'), \ldots, IS(C), \ldots, IS(C+L')$.

The encoder then chooses an integer-valued weight $W \leq L$ and selects W distinct associates, uniformly and at random from the L input symbols $IS(C-L'), \ldots, IS(C), \ldots, IS(C+L')$. As used herein, it should be understood that a "random" selection might be a pseudorandom selection. The output symbol is computed as the exclusive-or of the W associated input symbols. Other functions of the associated input symbols could be used, but in this example, the function is the exclusive-or of the associated input symbols.

For the tail-biting window encoder, the encoder computes the input symbol indices modulo K. For the one-pass window encoder, C and L are such that $0<=C-L'<=C+L'<=K-1$. To simplify the presentation below, for the one-pass window encoder it is assumed that if C and L do not satisfy either of these conditions, then the encoder logically truncates the window so that it never extends past either edge of the file.

If the window center is always set to K/2 and the window size L is always set to the file size K, then the window encoder behaves like a regular chain reaction encoder.

The consideration in selecting a window encoder is the behavior of the corresponding decoder. The window decoders (tail-biting or one-pass) have an advantage over a chain reaction decoder in that nearby output symbols are likely to share input symbol associates. The one-pass decoder has an additional advantage of being able to decode the file in one pass.

To begin an encoding operation, the encoder selects a window center, a window size and a weight. The window center distribution could be uniform over the file, or according to some specially-designed window center distribution WCD. Similarly, the window size could be fixed, based on the window center, or based on a specially-designed distribution itself. Finally, the weight W, could be chosen a number of ways, but one particularly advantageous selection process uses a Soliton Distribution based on a number of factors, including the window center C, the window size L and the file size K.

Restricting the set of possible associates for each output symbol generated may increase the reception overhead required to decode the file, yet encoding over a window instead of over the entire file still performs better in some ways. One benefit to the use of windows results in locality of the window and an increase in encoding speed. A second benefit is that a change in a contiguous portion of the file only effects encoded output symbols up to a window away in either direction. A third benefit is that if the whole file does not fit into memory at once, then the encoder can operate only on a window that does fit in memory and shift the window as the encoder reads the file.

In the next two sections, implementations of the tail-biting and one-pass window encoders are described that take advantage of the locality of the window to speed up the encoding process and do not require the whole file to be in memory at once.

A practical Tail-biting Window Encoder

For the practical tail-biting encoder, the window center is initially set to C=0, although the window center could initially be any position in the file. To compute an output symbol, the encoder chooses a window size L. Then the encoder chooses an integer valued weight $W \leq L$ and selects w distinct associates, uniformly and at random from the set $IS(C-L'), \ldots, IS(C+L')$, where indices are computed modulo K. The output symbol is computed as the exclusive-or of the W input symbols.

To compute the next output symbol, the encoder increments C by one, i.e., shifts the window center by one. The encoder then generates a new window size L, a new weight W and a new pool of associates. After each output symbol is computed, the encoder increments C by one. For every K output symbols generated, the window center returns to its original position, so the period of the encoder is K. The encoder sends the output symbols across the channel in random order as described above from the buffer of K output symbols generated during the period.

Instead of incrementing C by one each time, the encoder can choose an integer increment i and increment C by i. The increment i may be a fixed positive constant greater than zero, as in i=1 above, or it can be chosen from a distribution, in which case i can also be negative or zero. The increment i need not be an integer, e.g., i=0.33 indicates that three output symbols will be generated for each window center. If i is fixed and divides evenly into K, then the period of the encoder is equal to K/i. Otherwise, the period is equal to the average number of output symbols computed by the encoder in one pass over the file.

One view of the encoder is as a sliding window that generates an output symbol at each shift over the file. The associates of an output symbol are computed uniformly at random from a weight selected from a Soliton Distribution based on the window size. Since the window wraps around the end of the file, if the window size is chosen independently from the window center, then every position in the file is covered with equal probability, i.e., every input symbol in the original file is expected to be associated with an equal number of output symbols.

A Practical One-pass Window Encoder

When designing the one-pass window encoder, one key to maintaining a low reception overhead is that every input symbol in the original file should on average be associated with an equal number of output symbols. Since the window in the one-pass scheme does not wrap around, some adjustment might be needed to the window center and size, especially at the edges of the file, to achieve this.

The uniform distribution on window centers for a one-pass window encoder achieves this objective and is defined as follows. For the uniform distribution, the distribution on weights of output symbols depends on the window center of the output distribution. Let L(C) be the size of the window with a center at position C in the file, and let W(C) be the average weight of an output symbol generated by a window with a center at position C in the file. For purposes of explanation, assume a fixed window size L and a fixed average output symbol weight W, independent of the window center C, i.e., L(C)=L and W(C)=W for all C. Now define the uniform WCD as $$p(C) = \frac{1}{K+L-1} \text{ for } C = -L', \ldots, K-1+L', \quad \text{(Equ. 1)}$$

i.e., each window center between −L' and K−1+L' is equally likely to be chosen, where L'=(L−1)/2 and for simplicity L is assumed to be odd. Then, all windows are of size L except when the window center is too close to the edge of the file, i.e., when the window center C is either <L' or >K−1−'. When the window center C is closer than L' to the edge of the file, then the encoder chooses the output symbol from a virtual window of size L (which goes beyond the edge of the file), but all associates chosen that are beyond the edge of the file are ignored, i.e., are not considered to be associates of the output symbol. Thus, effectively the average weight of output symbols with window centers chosen close to the edge of the file are smaller than L, and in these cases the window center C is the center of the virtual window, not the actual window.

Figure 7:
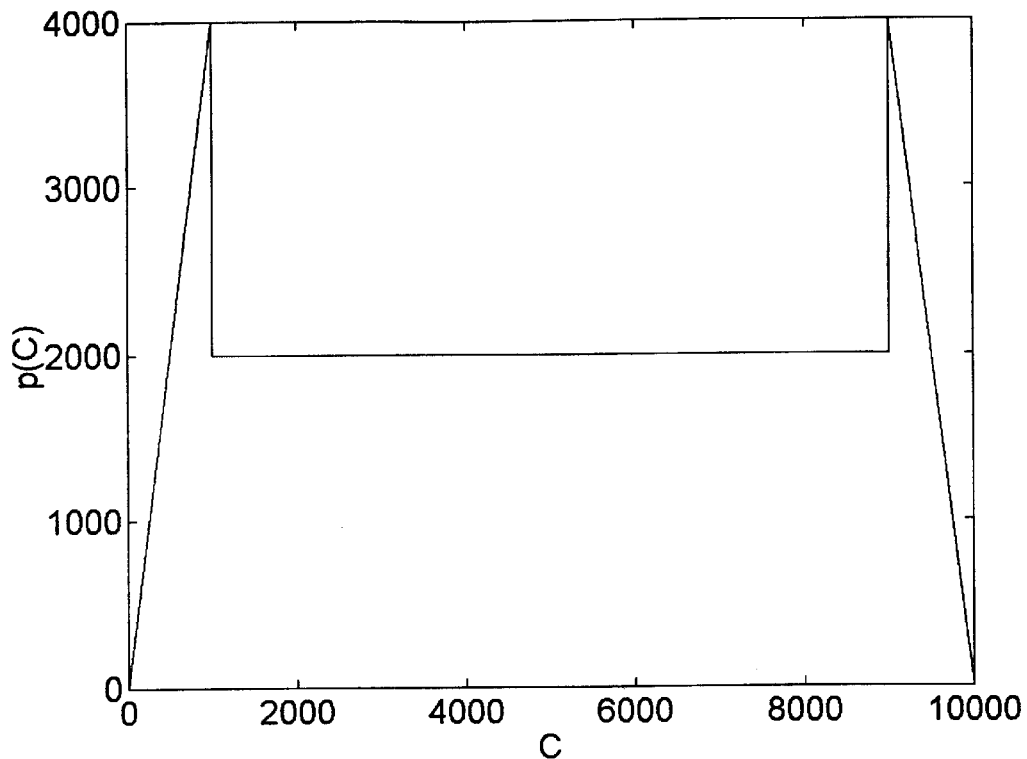
FIG. 7 is a plot of an unnormalized distribution of a window center for a one-pass window encoder.

The triangle distribution on window centers for a one-pass scheme eliminates the need to consider virtual windows that extend beyond the edge of the file and is defined as follows. The triangle distribution varies the size of the window at the beginning and end of the file, and also varies the probability of choosing a center near the beginning and end of the file, although the window center distribution in the middle of the file is uniform. Consider the unnormalized triangle WCD distribution:

$$p(C) = \begin{cases} 4C & \text{if } C < L' \\ L & \text{if } L' \leq C \leq K-1-L' \\ 4(K-1-C) & \text{if } C > K-1-L' \end{cases} \quad \text{(Equ. 2)}$$

where $$\sum_{C=0}^{K-1} p(C) = LK - 3L + 3$$

for L odd and LK−3L+4 for L even. Thus, the distribution can be normalized to a probability distribution by dividing p(C) by LK−3L+3 for L odd or by LK−3L+4 for L even. This distribution is shown in FIG. 7 and is referred to as a "triangle distribution" due to the shape of the distribution.

The window size L(C) for a window with center C is chosen as follows:

$$L(C) = \begin{cases} 2C & \text{if } C < L' \\ L & \text{if } L' \leq C \leq K-1-L' \\ 2(K-1-C) & \text{if } C > K-1-L'. \end{cases} \quad \text{(Equ. 3)}$$

When L(C)<W, it is not possible to have an output symbol of weight W for such a window. Thus, for a window center C near the edge of the file, the weight W of an output symbol must be chosen to be less than the window size L(C), i.e., W<=L(C). Two practical encoders that use the uniform distribution and the triangle distribution respectively are presented below.

A Practical One-pass Window Encoder Using the Uniform Distribution

Define the extended file $IS(-L_{max}+1), \ldots, IS(0), \ldots, IS(K-I), \ldots, IS(K+L_{max}-1)$ where the K symbols $IS(0), \ldots, IS(K-1)$, are the original file, $L_{max}$ is the maximum possible window size and the padded symbols on either edge of the file are all set to zero. Define $C_{min}$ and $C_{max}$ to be the minimum and maximum window center positions respectively, for which a window of size $L_{max}$ will be defined in the extended file.

For the practical one-pass encoder with the uniform distribution in Equ. 1, the window center is initially set to $C=C_{min}$. The window center could be set initially to any position $C_{min} \leq C \leq C_{max}$. To compute an output symbol, the encoder chooses a window size L and sets $L' = \lfloor L/2 \rfloor$ (assume L is odd). Then the encoder chooses an integer valued weight $W \leq L$ and selects W distinct associates, uniformly and at random from the set IS(C−L'), . . . ,IS(C+L'). The output symbol is computed as the exclusive-or of the W input symbols. If the output symbol has no associates in the original file, i.e., all of the associates are in the extended portions of the extended file, then it is discarded (or not generated at all).

To compute the next output symbol, the encoder increments C by one, i.e., shifts the window center by one. The encoder then generates a new window size L, a new weight W and a new pool of associates. After each output symbol is computed, the encoder increments C by one. When $C=C_{max}$, instead of incrementing C set $C=C_{min}$, so the window returns to its original position. For every $C_{max}-C_{min}$ output symbols generated, the window center returns to its original position, so the period of the encoder is equal to $C_{max}-C_{min}$. The encoder sends the output symbols across the channel in random order as described above.

Instead of incrementing C by one each time, it is possible to choose an increment i and increment C by i. The increment i may be a fixed integer or noninteger constant, as in i=1 above, or it can be chosen from a distribution, in which case i can also be negative or zero. If i is fixed, then the period of the encoder is equal to $(C_{max}-C_{min})/i$. Otherwise the period is equal to the average number of symbols computed by the encoder in one pass over the file.

Alternatively, the practical tail-biting window encoder can be used with the extended file IS(0), . . . ,IS(K+$L_{max}$-2), as its input to implement a one-pass window encoder with a uniform distribution. Any output symbol that does not have an associate in the original file is ignored by the encoder or not generated. The extra symbols in the extended file eliminate the output symbols that have input symbols at both ends of the original file for associates. If the decoder initializes the extra symbols as recovered and equal to zero, then input symbols at both edges of the file are not common to any output symbols.

A Practical One-pass Window Encoder Using the Triangle Distribution

For the practical one-pass encoder using the triangle distribution, the window size is computed from the window center using Equ. 3. One issue is how to choose the window center with the appropriate probability. In order to choose the window center and size, the encoder uses a counter i that takes on integer values uniformly from 0 to K−1. The encoder computes the window center and size from i as follows:

if i<L', then with probability i/L', the encoder chooses the window center to be C=i, and with probability (L'−i)/L', choose C=L'−1−i. The window size is set to L(C)=2C.

If i>K−1−L',then with probability (K−1−i)/L', the encoder chooses the window center to be C=i, and with probability (L'−K+1+i)/L', the encoder chooses C=2K−L'−i−1. The window size is set to L(C)=2(K−1−C).

For L'$\leq$i$\leq$K−L'−1, the encoder chooses C=i and L(C)=L.

Initially, the encoder uses i=0, although i can be initialized to any value from 0 to K−1. To compute an output symbol, the encoder chooses a window center C and a window size L(C) using i as described above. The encoder then chooses an integer valued weight W$\leq$L(C) and selects W distinct associates, uniformly and at random from within the window. The output symbol is computed as the exclusive-or of the W input symbols.

To compute the next output symbol, the encoder increments the counter i by one. The encoder then generates a new window center and size, a new weight W and a new set of W associates for the next output symbol, and then the output symbol is the exclusive-or of these W input symbols. After each output symbol is computed, the encoder increments i by one. For every K output symbols generated, the counter returns to zero. Since the encoder picks C based on the value of the counter, over time the window center will have the triangle distribution described by Equ. 2. For every K output symbols generated, the counter returns to its original value, so the period of the encoder is K. The encoder sends the output symbols across the channel in random order as described above.

Instead of incrementing i by one each time, it is possible to increment i by some other value. The increment is not necessarily integer-valued. The increment i may be a fixed constant, as in i=1 above, or it can be chosen from a distribution, in which case i can also be negative or zero. If i is fixed, then the period of the encoder is equal to K/i. Otherwise the period is equal to the average number of symbols computed by the encoder in one pass over the file.

If the window size is small compared to the file size, then in general the reception overhead of the practical one-pass window encoder using the triangle distribution, the practical one-pass window encoder using the uniform distribution and the tail-biting window encoder will be similar.

Additional Parameters for the Practical Encoder

It is possible to vary a number of parameters to vary the performance and reception overhead of the different window encoders. As discussed previously, the window can be shifted by an increment greater than one, or even randomize each increment, although the encoder should preferably maintain some locality by keeping the shift small compared to the window size. The number of symbols computed at each shift can also be increased or varied, although here the number of symbols generated per period is increased and thus the buffering requirements in the encoder.

How the window size and center vary, and how the weight of an output symbol varies, depends on the order that they are computed. For instance, if the encoder first computes the size of the window, then which Soliton Distribution is used can vary according to the window size. In fact, it preferably varies according to the window size so that the encoder can generate output symbols with weight up to the maximum of the window size. Similarly, the window size can vary according to the position of the window in the file as in the triangle distribution.

Performance of the Practical Encoder

Consider two output symbols that are computed consecutively by the encoder. Let the first output symbol be computed as the exclusive-or ("XOR") of $W_1$ input symbols chosen from a window of size $L_1$. Let the second output symbol be computed as the XOR of $W_2$ input symbols chosen from a window of size $L_2$. If the window overlap is defined to be the number of input symbols covered by both windows, then if the two windows overlap by $L_0$ symbols, the expected number of input symbols common to the two output symbols is $L_0$ ($W_1/L_1$) ($W_2/L_2$).

Figure 8:
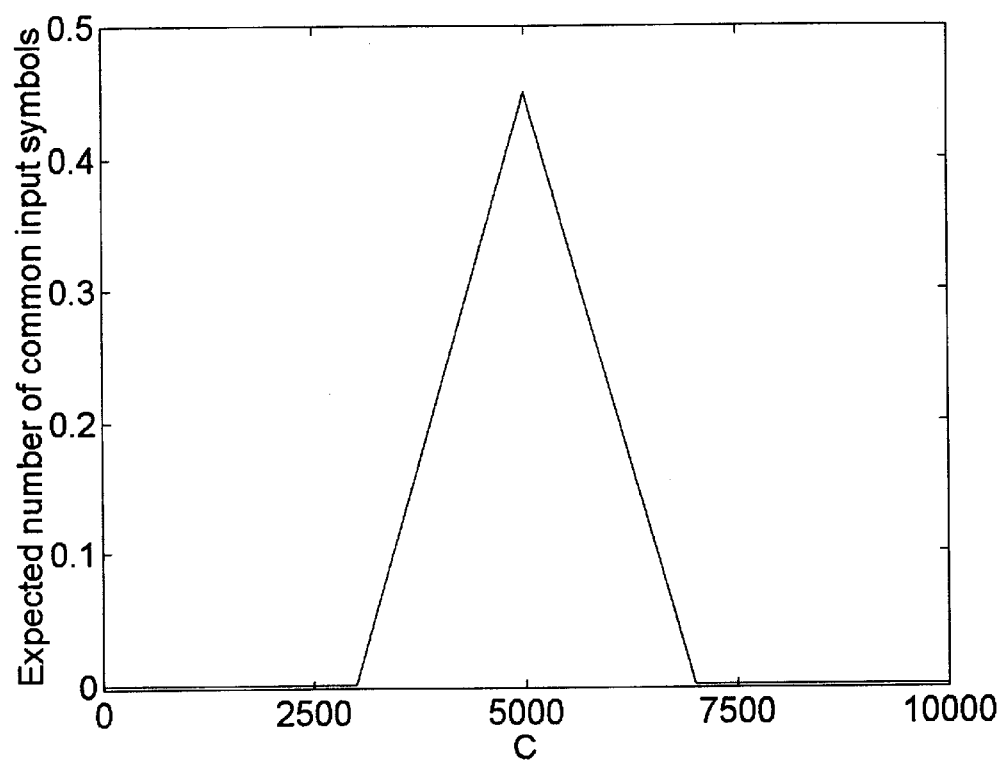
FIG. 8 is a plot of an expected number of input symbols in common between two windows.

In general, the expected number of input symbols common to two output symbols with a given weight increases linearly with the amount of window overlap. Alternatively, consider the amount of overlap obtained if a window of fixed size that slides across a file is compared with a window that is the same size and placed at the center of the file. The overlap is zero until the windows start to overlap, grows linearly as the overlap increases, and then decreases linearly as the overlap decreases until there is no overlap again. The expected number of input symbols in common is illustrated by FIG. 8, which shows the expected values for a file size of 10,000, a window size of 2,001 and an average output symbol weight of 30 using the uniform distribution on window centers.

If on average one output symbol is computed for each possible window center, then in one period each input symbol is expected to be in W output symbols on average, where W is the average weight of an output symbol. For a file size K=100,000, W$\approx$30 for the Soliton distribution, so on average each input symbol in the file will be associated with about 30 output symbols for the Soliton distribution in a period.

If the cache is large enough to hold a window's worth of input symbols at once, then an input symbol will probably only have to be read into cache once each period. If the cache size is S symbols and if S is greater than a window size L, then once an input symbol is brought into the cache it will still be in cache for each subsequent output symbol that has it as an associate. Because on average the number of times an input symbol is used by an output symbol is approximately W per period when the window increment is one, a cache miss is expected about l/W fraction of the time for a practical window encoder. If S is less than L then a cache miss is expected approximately 1−S/L fraction of the time, which is potentially very high as the window size L grows from the cache size S to the file size K.

In one implementation, the local memory is a processor cache and the remote memory is RAM. Typically, accessing the processor cache is two to ten times faster than accessing memory, so using a window size L that is smaller than the cache size S can result in a big improvement in speed for the practical window encoder over the original chain reaction encoder. If the cache is as big as a window, then the gain could be considerable. If the difference between memory access and disk access is measured then the improvement in speed can be orders of magnitude greater. The encoder may be sped up even further by computing multiple output symbols for each shift of the window. However, the more symbols computed per period, the greater the buffering requirements for the encoder to ensure that the output symbols on the channel can appear in random order.

The cache reads in a standard number of bytes from memory each time there is a cache miss. If the symbol length is less than a cache line, then for the practical window encoder many symbols will already be in cache when the encoder needs them, since a nearby symbol has already been read. This can also improve the speed of the encoder since it is known that these symbols are going to be used soon as the associates of an output symbol with high probability.

The Window Decoder

The window decoder process can be motivated by first describing the decoder in a manner that is similar to the original chain reaction decoder with the additional parameter of a window. Some decoder heuristics are then presented that improve the performance of the decoder both for the tail-biting and the one-pass windowing schemes.

Upon receiving an output symbol and its description, the decoder knows or computes the window center C, the window size L, the weight W, and the indices of the W input symbols (i.e., the list of associates) based on the key, analogous to how the encoder works. Given an ensemble of output symbols, the decoder repeatedly recovers input symbols according to the recovery rules of the chain reaction decoder.

The description can be an explicit listing of the parameters C, L, W and the information required to identify the associates, or it can be a key from which all the parameters are computed. Alternatively, some parameters may be listed explicitly, while others may be described with a key. For instance, a decoder based on the practical window encoder may require a key to compute the window size L, weights W and all the associates, while it may explicitly identify the window center C. In a synchronous environment, the decoder can use timing information to determine the encoding parameters of each symbol. As many different output symbols as the key space allows can be generated. In the typical encoder/decoder system, the key space allows for many more unique output symbols than there are input symbols in the file.

In the next two sections the relationship between distance metrics and the decoder performance is developed and some heuristics that are aimed to optimize decoder performance according to these metrics are presented.

Distance and the Decoder Performance

From the recovery rule, when an output symbol of weight one releases an input symbol, any other output symbol with that input symbol for an associate, has its weight reduced by one. Any output symbol that has had its weight reduced to one, will be able to release an input symbol that is at most a window away. If the window is small enough, then these output symbols may have a number of common input symbols as associates.

Decoding over a window instead of the whole file has some significant advantages. One advantage is that the decoder can use the locality of the window to increase the decoding speed by taking advantage of the difference between local and remote memory access times by always using output symbols with window centers that are close to each other from one decode operation to the next. If the whole file does not fit into memory at once, then for the one-pass windowing scheme, the decoder can decode the file in order and shift the window as it reads in the rest of the file. The decoder can decode the file either backwards or forwards, so if only part of the file is needed, the decoder only needs to decode at most half of the file to get to any portion.

Define the ripple to be the set of output symbols with reduced weight one. After each input symbol is recovered, the decoder can pick any output symbol in the ripple to recover another input symbol. The order that the output symbols in the ripple are processed defines a decoding schedule for the input symbols. By careful selection of this order, the decoding speed can be optimized. It is desirable for the decoder to take maximum advantage of the locality of the window by always recovering nearby symbols.

In order to evaluate the performance of the different strategies for processing output symbols in the ripple, a metric is introduced to measure the performance of the decoding schedule. One such metric is the average distance between released input symbols. If this metric is minimized, the decoder should operate faster. Another metric is a measure of how closely the decoding order follows the order of symbols in the file.

Some of the different ways the distance between consecutive symbols or sets of symbols in the decoding schedule can be measured are presented before introducing a decoder metric.

The Distance Between Input Symbols

Consider two input symbols $u_i$ and $y_j$. The distance between IS(i) and IS(j) is a function of their respective positions i and j in the file, which can be written as d(i,j). For instance, the distance may be defined as the absolute difference of the positions of the two symbols, i.e., $$d(i,j)=|i-j|, \quad \text{(Equ. 4)}$$

or the difference squared $$d(i,j)=(i-j)^2. \quad \text{(Equ. 5)}$$

For the tail-biting window encoder, the wrap-around causes the input symbols at the edges of the file to be common to some output symbols, so it may be preferable that the distance defined as $$d(i,j)=\min\{|i-j|,K-|i-j|\}, \quad \text{(Equ. 6)}$$

or $$d(i,j)=\min\{(i-j)^2,(k-|i-j|)^2\}, \quad \text{(Equ. 7)}$$

to account for the interdependence of the edges of the file.

From the analysis for the encoder, the expected number of associates shared by two output symbols increases linearly with the window overlap. Since the number of shared associates is only significant once the windows overlap by some minimum amount, it may be preferred to define the distance in terms of a threshold $\delta$. The larger $\delta$ is chosen the further apart window centers are, so the smaller the amount of window overlap. The distance is defined as $$d(i, j) = \begin{cases} 1 & \text{if } |i - j| \geq \delta \\ 0 & \text{otherwise.} \end{cases} \quad \text{(Equ. 8)}$$

For example, $\delta$ may be chosen to be equal to L, where L is the size of a window. This is especially appropriate since input symbols that are further than two windows apart will never be associated with output symbols whose windows overlap, so the output symbols will never have any common input symbols for associates. If this level of granularity is not sufficient, a coarse quantization of the differences may be preferable, such as $$d(i, j) = \begin{cases} c_1 & \text{if } i - j \geq \delta_1 \\ \vdots & \vdots \\ c_n & \text{if } \delta_n - 1 > i - j \geq \delta_n \\ 0 & \text{otherwise} \end{cases} \quad \text{(Equ. 9)}$$

where $\delta_1 > \delta_2 > \ldots >_n$, and $c_1 > c_2 > \ldots > \delta c_n$, for some small integer n. Similarly, threshold and quantization distance functions can be defined that account for the window wrap around.

As another natural example, $d(i,j)$ can be defined as $d(i,j)=|i-j|/L$ if $|i-j|<=L$ and $d(i,j)=1$ otherwise. The distance function can be used in a more general way than simply as a function of the position of two symbols in the file. It can also be used to calculate the distance between a symbol's position in the file and some other position in the file, as well as the distance between a symbol's position in the file and a weighted average of the positions of the last few symbols that were recovered.

Performance Metrics for the Decoder Schedule

Consider a decoding schedule that recovers the input symbols in the following order $IS(v_0), \ldots, IS(v_{K-1})$. The decoding schedule defines an input symbol position decoding order of $v_0, v_1, \ldots, v_{K-1}$, which is a permutation on the integers from 0 to K-1.

It is desirable to define a metric, $\Delta$, that is a good measure of the decoder performance. The metric could be based on how well the decoder takes advantage of locality when creating the decoding schedule, and the potential decoder speed up. Or, for the case of the one-pass decoder, it may be preferred that the metric to measure the maximum decoding spread, defined as the distance between the highest position decoded and the lowest position not decoded so far in the schedule. In either case, the distance functions listed in the previous section are used as appropriate for the metric being considered.

If the primary concern is to decode the file in a single pass, then a good metric may be $$\Delta = \frac{1}{K} \sum_{i=0}^{K-1} d(v_i, i), \quad \text{(Equ. 10)}$$

which measures the average distance between the schedule and the file listed in order. However, if the concern is more with the maximum decoding spread rather than the average, a better metric may be $$\Delta = \max_i \{d(v_i, v_j) : j > i, v_i > v_j\}. \quad \text{(Equ. 11)}$$

Alternatively, it may be desirable to minimize the average distance between consecutive input symbols on the schedule, $$\Delta = \frac{1}{K} \sum_{i=1}^{K-1} d(v_i, v_{i-1}), \quad \text{(Equ. 12)}$$

or the previous m input symbols on the schedule, $$\Delta = \frac{1}{K} \sum_{i=m}^{K-1} d(v_i, s_i), \quad \text{(Equ. 13)}$$

where $$s_i = \sum_{j=i-m}^{i-1} \alpha_{i-j} v_j,$$

and m and the coefficients $\alpha_1 24 \alpha_2 \geq \ldots \geq \alpha_m$ are based on factors such as the cache size and the average weight of each output symbol. The following metric could also be used, $$\Delta = \frac{1}{K} \sum_{i=0}^{K-1} \sum_{j=0}^{K-1} d(v_i, v_j) \alpha^{|i-j|}. \quad \text{(Equ. 14)}$$

A weighted combination of these metrics can be defined, or numerous other metrics to measure performance. Often, the best metric depends on the application.

Decoder Heuristics

Unlike the original chain reaction decoder, the performance of the window decoder is crucially dependent on the order that output symbols in the ripple are processed. Depending on the metric of choice, there are several different heuristics for improving the performance of the decoder.

Another consideration is how to store the output symbols at the decoder. One option is to sort them by window center when they arrive. This could be a simple bucket sort or it could be an exact ordering. Either way, if the decoder is designed to minimize $\Delta$, then output symbols are going to be accessed in order of window center positions. If they are stored close together in disk or memory, then the decoder will be faster since sequential disk and memory access is faster than random access.

Optimizing the decoding schedule according to some of these metrics may result in the decoder making a number of passes through the file before it has completely decoded the file. This is acceptable for minimizing the cache miss rate, but if the file does not fit in memory or it is desired to decode in order, this behavior is not desirable, and it may be preferred to encourage the decoder to favor one direction over another by using a weighted decision to determine which symbol to decode next.

The simplest decoder strategy would be to process elements of the ripple in increasing order of the input symbol's position. For the one-pass window, this strategy is optimal if it is desired to minimize the maximum decoding spread. For the tail-biting window, the encoder has no preference for one part of the file over another, so in some cases it might be much faster to decode in decreasing order, or from some point in the middle of the file. There may also be no reason for the decoder to favor recovering input symbols in one direction over another, or from one part of the file over another.

A second simple strategy is to always recover an input symbol that is the minimum distance away from the last input symbol recovered. In case of ties, the decoder can choose one at random, or always favor one direction over another. Depending on where the decoding is started, the effectiveness of this strategy can vary. If there is one area of the file that is covered more densely by output symbols in the ripple, then starting at the dense portion seems to make more sense, since there is a greater chance of recovering more input symbols from that portion of the file. Secondly, if the next symbol that is on the ripple is more than a couple of windows away, then all benefits of locality are immediately lost, and it might be better to move to a completely different part of the file and start recovering input symbols.

A third decoder strategy is to divide the file into n contiguous blocks $b_1, b_2, \ldots, b_n$ of size K/n input symbols in each. Each output symbol on the ripple will fall into one of these blocks based on its window center position. Initially, the decoder starts to decode using an output symbol in the ripple that occurs in the most densely populated block. After each output symbol has been processed, if the next output symbol on the ripple falls within some range (say a window size) then it is processed. Otherwise, an output symbol in the current most densely populated block is used to recover an input symbol.

It is also possible to make the decoder favor processing output symbols in one direction over another. However, unless there is a constraint on accessing the data in one direction over another then there may be no advantage to this if the file cannot be recovered in one-pass. There may be benefits in favoring to continue decoding in one direction instead of switching directions continually, e.g., it may be advantageous to move towards the input symbols that have been visited the farthest in the past and this can be achieved by continually decoding in one direction.

The third strategy works well except it imposes artificial boundaries on the file. A portion of the file may have a lot of output symbols in the ripple on either side of a boundary between two blocks, so that neither block is the most densely populated, but that specific region has the highest concentration of weight one symbols in the ripple. A partial solution is to find the maximum pairwise sum $b_i + b_{i+1}$, for $i=1, \ldots, n$ and start decoding at the pair of blocks achieving this maximum. The size of the blocks may also have a significant effect on the decoder's performance.

If it is also desirable to minimize the average output symbol weight used by the decoder, then the decoder could adopt a strategy that prefers to process symbols with fewer initial associates when it processes the ripple. The improvement in speed by lowering the average initial weight of output symbols used by the decoder should weighed against the possible slow down due to loss of locality.

The Soliton Distribution for a Window

A basic robust Soliton Distribution determines a distribution on the weights of the output symbols based on the file size K. In the worst case, the number of symbols required to decode a file of size K is $K + c\sqrt{K}$ where the constant c=11 or 12. The worst case reception overhead percent is therefore $100 \cdot c/\sqrt{K}$. When the distribution is restricted to a maximum weight of L then the robust Soliton Distribution should be adjusted so that no weight W>L is generated, where L is the window size, and so that the reception overhead is reflective of a file of size K.

Define $\rho(i)$ to be the probability a symbol has weight i. Consider the original robust Soliton Distribution:

Define the parameter $R = \alpha_R + \beta_R \sqrt[4]{K}$.

Define the initial ripple size $S = \beta_S \sqrt{K}$, to be the expected number of weight one output symbols in every K symbols received.

Define $\kappa = K/R - 2$ and $\tau = \log_2(R) + 1$ to be the number of different kinds of low weight and high weight symbols respectively. The low weight symbols have weights from $1, \ldots, \kappa$, while the high weight symbols are exponentially spaced at weights from $K/R, 2K/R, \ldots, K$.

The low weight kinds have relative probabilities:

$$\rho(i) = \begin{cases} \dfrac{S}{K} & \text{for } i = 1 \\ \dfrac{1}{i(i-1)} \dfrac{K}{K - iR} & \text{for } i = 2, \ldots, \kappa. \end{cases} \quad \text{(Equ. 15)}$$

The high weight kinds have relative probabilities:

$$\rho\left(\frac{K}{2^{\tau-i}}\right) = \beta_p \frac{2^{\tau-i}}{K} \text{ for } i = 1, \ldots, \tau. \quad \text{(Equ. 16)}$$

Normalize $\Sigma_i \rho(i)$ to sum to one.

Consider the following different distributions for the window encoders:

Soliton 1: The Soliton Distribution based on the window size where K is replaced with l everywhere in the original robust Soliton Distribution.

Soliton 2: The Soliton Distribution with the distribution and the number of low weight kinds based on the file size and the distribution of the high weights based on the window size and placed at intervals based on the window size. So, the original robust Soliton Distribution with K is used, except for high weights:

$$\rho\left(\frac{K}{2^{\tau-i}}\right) = \beta_p \frac{2^{\tau-i}}{L} \text{ for } i = 1, \ldots, \tau. \quad \text{(Equ. 17)}$$

Soliton 3: The Soliton Distribution with the distribution and the number of low weight kinds based on the file size and the distribution of the high weights based on the file size and placed at intervals based on the window size. So, the original robust Soliton Distribution is used, except for high weights:

$$\rho\left(\frac{l}{2^{\tau-i}}\right) = \beta_p \frac{2^{\tau-i}}{K} \text{ for } i = 1, \ldots, \tau. \quad \text{(Equ. 18)}$$

There are many further changes that can be made to the original robust Soliton Distribution. An important factor to consider in designing any Soliton Distribution for a window is that it is desirable to have the average weight of an output symbol to reflect the average weight of an output symbol based on encoding over the whole file.

The Soliton Distribution can be stored as a table in memory in both the encoder and the decoder. In one column of the table, there is a list of all the low weight and high weight kinds in increasing order of weight. In the second column, there is an associated cumulative probability for each kind that is the sum of the probability of that kind and the probability of all the kinds above it in the table. The encoder uses the key to generate a uniform random number u. The weight W for an output symbol is chosen according to the first entry in the table that has a value larger than u.

When the window size is variable, it is undesirable to have to store a table for every possible window size. Therefore the same table is used each time but u is normalized, so that it cannot index an entry in the table if the corresponding weight is greater than the window size. If there is a small set of possible window sizes, then a Soliton Distribution table for each window may be more appropriate.

Experimental Results

The sections below set forth various experimental results that can be used to optimize the encoder and decoder design.

Encoding and Decoding Speed Performance Results

All the experiments were run on a computer with a 550 MHz Pentium III processor with 512 KB of cache memory and 512 MB of RAM. All the XOR operations took place in the MMX registers of the Pentium III processor. Additional improvements might be possible by using other registers on the processor to encode, and by writing the output symbols directly to memory so that they do not pollute the cache.

In each run, 16 GB worth of output symbols were generated using symbol lengths of 8, 16, 32 and 64 bytes. The buffer to store the output symbols was chosen to be 4 MB. For each shift of the window 1, 2, 4 or 8 output symbols were generated. Where we computed more than one symbol per shift, the number of symbols generated in each period increased the buffer size used proportionately.

TABLE 1

| Batch name | Symbol length (in bytes) | File Size K (in symbols) |
|---|---|---|
| Type 1 | 8 | 1,000,003 |
| | 16 | 1,000,003 |
| | 32 | 1,000,003 |
| | 64 | 1,000,003 |
| Type 2 | 8 | 32,771 |
| | 16 | 16,411 |
| | 32 | 8,209 |
| | 64 | 4,099 |
| Type 3 | 8 | 65,537 |
| | 16 | 32,771 |
| | 32 | 16,411 |
| | 64 | 8,209 |

There were three types of performance experiments using no windowing. Table 1 lists the symbols lenghts and file sizes for each of the three types of performance experiments, where each row corresponds to a different experiment. Type 1 comprises experiments where the number of input symbols in the file is set to K=1,000,003. This type was chosen in order to benchmark the performance of the chain reaction codes using no windowing when the file fits into RAM but does not fit into the cache. For Type 2, for each symbol length, K was chosen to be first prime number that would result in the file length being larger than 256 KB, i.e., half the length of the cache. For Type 3, for each symbol length, K was chosen to be the first prime number that would result in the file length being larger than 512 KB, the length of the cache.

For comparison, two series of tests for the sliding window codes are presented here. A file of K=1,000,003 is used with a window size of at most 65,537, so the performance results are valid for both types of windowing schemes (tail-biting and one-pass) since the edges of the file did not have much influence on the encoder performance. The actual encoder used for the tests was the practical tail-biting window encoder with a fixed window size and a window center shift size of one. For the first series with a fixed window experiments, the window size was picked to be the same size as the file size in Type 2, and thus the window size is half that of the processor cache. For the second series of runs, the window size was picked to the same size as the file size in Type 3, and thus the window size is the same as that of the processor cache. In both cases, 1, 2, 4 and 8 symbols were generated at each shift, to see if further advantage of the locality of the window could be taken by having more cache hits for each input symbol. 1, 2, 4 and 8 symbols were computed for each shift of the window for both series of runs.

Figure 9:
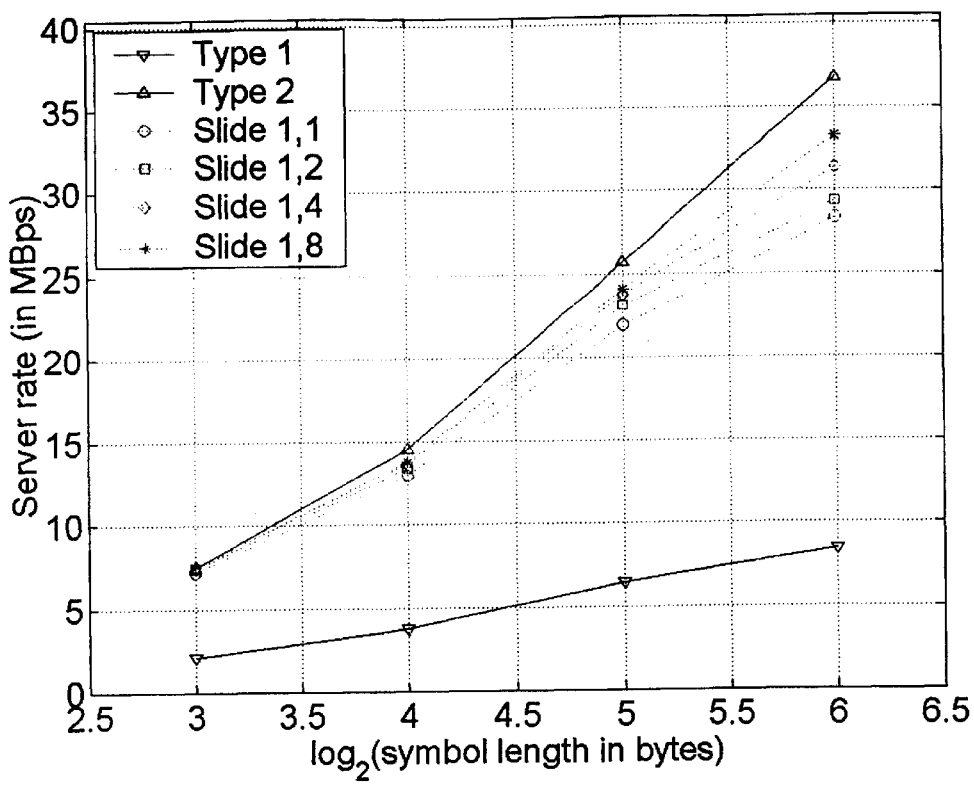
FIG. 9 and FIG. 10 show plots of encoder performance for various symbol lengths and window sizes.
Figure 10:
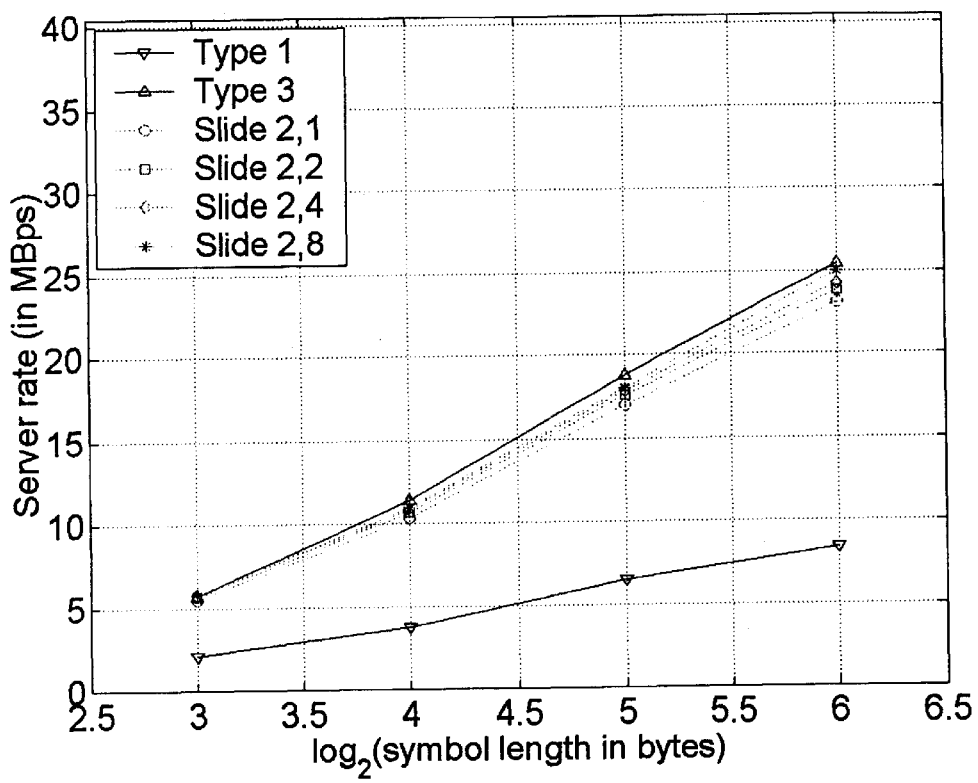

The performance results for the two series of experiments are shown in FIG. 9 and FIG. 10, respectively. The first series of runs are labeled Slide 1,x where x refers to the number of output symbols generated for each shift of the window. Similarly the second series of runs are labeled Slide 2,x. As expected, the performance of the encoder in Type 1 experiments was a lower bound on the sliding window encoder performance and Type 2 and Type 3 performance results were upper bounds. The sliding window performance was very close to that of Type 2 and Type 3, so there does not seem to be a large penalty in cache misses for sliding the window across the file instead of keeping it stationary. On the other hand, the gain in cache hits by using the window appears to be considerable.

The performance was better for the first series of experiments where the window size was only half the cache size than for the second series of experiments where the window was the size of the cache. This likely due to the encoder's program and other operating system programs being in the cache, so that the entire cache could not be used to store the symbols in the window. The optimal window size relative the cache size might need to take this into account.

Increasing the number of symbols computed per shift doubles the buffer size but does not seem to improve the performance by much, especially as the window gets larger. Therefore it is probably best to just compute one symbol or less per shift on average depending on how large the buffer is.

Tail-biting Window Reception Overhead Results

For the tail-biting window, the three Soliton Distributions Soliton 1, 2 and 3 were run for a window using the Soliton Distribution formulae set forth above, to see the difference in reception overhead for a file of size K=100,003 and a fixed window of size L=10,007. Two reference simulations encoding over the entire file were also run at once using the original Soliton Distribution. In Ref 1, a file size equal to the window size of 10,007 was used, to get a lower bound on the reception overhead required if the file was sent in blocks. In Ref 2, a file size equal to the file size of 100,000 was used, to compare the reception overhead to that of encoding over the entire file at once. The results are shown in Table 2.

As expected, the tail-biting window scheme performed significantly better than a blocking scheme with blocks the size of a window, but worse than an encoder that generates output symbols over the entire file. Even though Soliton 3 has a better average reception overhead than Ref 2, the original robust Soliton Distribution was designed to minimize the worst case reception overhead and not the average. The worst case for Ref 2 was less than that for all three Soliton runs. While Soliton 1 and Soliton 2 never required a reception overhead of more than 4.2%, Soliton 3 required more than 5% on eleven of ten thousand runs.

TABLE 2

| Batch | Ref 1 | Ref 2 | Soliton 1 | Soliton 2 | Soliton 3 |
|---|---|---|---|---|---|
| Input symbols | 10,007 | 100,000 | 100,000 | 100,000 | 100,000 |
| Window size | — | — | 10,007 | 10,007 | 10,007 |
| Mean symbols | 10,446 | 101,510 | 103,390 | 102,710 | 101,430 |
| Average overhead | 4.46% | 1.51% | 3.39% | 2.71% | 1.43% |
| Max symbols | 10,776 | 103,173 | 104,185 | 103,952 | 121,674 |
| Max overhead | 7.76% | 3.17% | 4.19% | 3.95% | 21.7% |

One-pass Window Reception Overhead Results

For the one-pass window, a number of simulations were run using the triangle distribution with different maximum window sizes to see the difference in reception overhead required at the decoder. A file size of K=100,000 was used and maximum window sizes of L=5,003, 10,007 and 20,011. Soliton 2 was used for the distribution, based on the maximum window size. At the edges of the file, when the window size was less than the maximum window size, the table was normalized for the Soliton Distribution so that only the entries that have a value less than the chosen window size could be picked. The results are shown in Table 3, which compares the reception overhead for the one-pass window with a Soliton 3 distribution based on the maximum window size, for various window sizes and a file size of K=100,000. There were 20,000 runs in each batch.

TABLE 3

| Maximum window size | 5,003 | 10,007 | 20,011 |
|---|---|---|---|
| Mean symbols | 104,297 | 102,908 | 102,636 |
| Average overhead | 4.30% | 2.90% | 2.64% |
| Max symbols | 107,066 | 105,177 | 104,437 |
| Max overhead | 7.07% | 5.18% | 4.44% |

A number of simulations were also run using the triangle distribution with a maximum window size of 5,003 and a file size of K=100,000 to see how close it was possible to come to decoding the file in order. Soliton 2 was used for the distribution and the symbols were processed in the ripple in increasing order of input symbol position. The maximum decoding spread was used for our distance metric and 9,016 iterations were run.

Output symbols that on aggregate were 106.3% of the length of the file were collected before we started to decode and the average decoding spread was 17,890. The worst case decoding spread was 71,197. The decoder had a maximum decoding spread of greater than 4 window sizes less than 20% (1733/9016) of the time and a maximum decoding spread of greater than 5 window sizes less than 5% (430/9016) of the time.

Applications

Any application that uses a regular chain reaction coder might also benefit from the sliding window scheme. However, there are some applications for which the sliding window schemes have a large advantage over the chain reaction coder. One advantage is the potential speedup at both ends due to the locality of the window and the cache.

The tail-biting window encoder is very useful when the whole file cannot fit in memory at the encoder but the file does fit in memory at the decoder. The one-pass window is very useful when the whole file does not fit in memory at either the encoder or decoder since it allows the file to be encoded and decoded in one direction and work on only a portion that does fit in memory is needed at any instant in time.

For real time applications, such as streaming media, the one-pass window can be used to decode the file in real time. This can also be done using a blocking scheme where the delay is determined by the size of each block. For a blocking scheme, the encoder has to wait for the whole block to be generated before it can encode, and the decoder has to wait for the whole block to be received before it can decode. Since the window size is generally much smaller than the block size, the one-pass window may have a much smaller delay, as the encoder can generate output symbols without any delay and the decoder can decode immediately as well.

On a channel where the loss is not independent for each packet, such as a bursty loss environment like the Internet, additional delay is introduced by permuting the packets before they are sent out on the channel, to make the losses appear independent to the decoder. The amount of delay depends on the length of the bursts in the channel.

Another application for a windowing scheme is in the distributed storage of files. If a file is encoded on a storage device using a sliding window and if only a local portion of the file is changed then the encoding changes only affect output symbols at most a window away on either side, instead of potentially affecting the encoding of all output symbols. This makes updating a distributed data storage system far more simple and efficient.

For example, consider a file of size K=1,000,000. Consider two scenarios: In the first scenario, the chain reaction encoder is used without windowing on the whole file, in the second a chain reaction window encoder is used with a window size L=10,000. Assume that 2,000,000 output symbols are generated, expecting a worst case loss rate of about 48%, so about twice as many output symbols are generated and stored as there are original input symbols. If 5,000 contiguous input symbols are changed, then for the window scheme on average at most 2·(5,000+2·10,000), or 50,000 output symbols are affected since only output symbols that are within a window of the changed input symbols are affected. In contrast, for the encoding over the whole file, all 2,000,000 output symbols might have to be looked at to see if they should be updated, since for each output symbol it would have to be determined if any of its associated input symbols is within the changed set of input symbols.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of generating an output symbol, wherein the output symbol is selected from an output alphabet and the output symbol is such that an input file, comprising an ordered plurality of input symbols each selected from an input alphabet, is recoverable from a set of such output symbols, the method comprising the steps of:

determining, for a given output symbol, a list AL that indicates W associated input symbols, within a subset S of the input symbols comprising the input file, to be associated with the output symbol, where W is a positive integer, where at least two output symbols have different values for W associated therewith, where W is greater than one for at least one output symbol, and where the number of possible output symbols is much larger than the number of input symbols in the input file; and generating an output symbol value from a predetermined function of the W associated input symbols indicated by AL.

2. The method of claim 1, further comprising the steps of:
calculating W from a key I associated with the given output symbol; and
calculating AL from key I.

3. The method of claim 2, further comprising a step of selecting subset S to be a window of input symbols such that consecutive instances of the step of determining are performed within the window.

4. The method of claim 2, further comprising a step of selecting the subset S such that consecutive instances of the step of determining are performed within the subset.

5. The method of claim 1, further comprising the steps of:
selecting the subset S using a sliding window;
buffering a plurality of output symbols generated according to the step of generating; and
reordering the buffered output symbols prior to transmission.

6. The method of claim 5, wherein the step of reordering is a step of pseudorandomly reordering.

7. The method of claim 5, wherein the sliding window is a tail-biting window.

8. The method of claim 5, wherein the sliding window is a one-pass window.

9. A method of transmitting the information content of an input file, where the input file is an ordered plurality of input symbols each selected from an input alphabet and the input file is recoverable from a set of output symbols each selected from an output alphabet, the method comprising the steps of:
generating a plurality of output symbols, wherein an output symbol of the plurality of output symbols is generated by the steps of:
a) determining a list AL that indicates W associated input symbols, within a subset S of the input symbols comprising the input file, to be associated with the output symbol, where W is a positive integer, at least two output symbols have different values for W associated therewith, W is greater than one for at least one output symbol, and the number of possible output symbols is much larger than the number of input symbols in the input file; and
b) generating an output symbol value from a predetermined function of the W associated input symbols indicated by AL; and
transmitting the generated plurality of output symbols.

10. The method of claim 9, wherein the step of generating a plurality of output symbols is a step of generating independent pluralities of output symbols at each of a plurality of sources, wherein the pluralities are independent in that each source of the plurality of sources determines its lists of associated input symbols without requiring reference to lists generated by other sources of the plurality of sources without one independent source entirely duplicating the information output of another independent source.

11. The method of claim 9, further comprising a step of distributing the plurality of output symbols over a plurality of channels such that the information content provided by one channel is not entirely duplicative of the information content of another channel.

12. The method of claim 9, wherein the step of determining comprises:
selecting, from a key alphabet, a key I for the output symbol being generated,
wherein the key alphabet contains many more members than the number of input symbols in the ordered set of input symbols;
determining a weight, W(I), as a function of I;
selecting W(I) of the input symbols in subset S according to a function of I, thus forming a list AL(I) of W(l) input symbols associated with the output symbol; and
calculating a value B(I) of the output symbol from a predetermined value function of the associated W(I) input symbols.

13. The method of claim 9, further comprising the steps of:
selecting the subset S using a sliding window;
buffering the generated plurality output symbols; and
reordering the buffered output symbols prior to transmission.

14. The method of claim 9, wherein the step of reordering is a step of pseudorandomly reordering.

15. The method of claim 9, further comprising the steps of:
storing at least some of the input symbols that are in the subset S in a first memory;
storing at least some of the input symbols that are not in the subset S in a second memory, wherein access times for the first memory are shorter than access times for the second memory;
when the subset S changes and old input symbols are removed as members of subset S, removing the old input symbols from the first memory;
when the subset S changes and new input symbols are added as members of subset S and memory locations are available in the first memory, moving the new input symbols from the second memory to the first memory.

16. The method of claim 15, wherein the subset S is a window and changes to subset S occur by a logical shift of the window, the method comprising the steps of:
removing an input symbol from the first memory when the window moves beyond the input symbol; and
moving an input symbols from the second memory to the first memory when the window moves to include the input symbol.

17. The method of claim 9, wherein the step of determining the list AL uses variable size subsets.

18. The method of claim 17, wherein the size of the subset is such that the subset includes less than all of the input symbols comprising the input file for some output symbols and the subset includes all of the input symbols comprising the input file for other output symbols.

19. A method of encoding an input file into an output file representing the information content of the input file, where the input file is an ordered plurality of input symbols each selected from an input alphabet and the output symbols are each selected from an output alphabet, the method comprising the steps of:
generating a plurality of output symbols, wherein an output symbol of the plurality of output symbols is generated by the steps of:
a) determining a list AL that indicates W associated input symbols, within a subset S of the input symbols comprising the input file, to be associated with the output symbol, where W is a positive integer, at least two output symbols have different values for W associated therewith, W is greater than one for at least one output symbol; and
b) generating an output symbol value from a predetermined function of the W associated input symbols indicated by AL; and
storing the generated plurality of output symbols as the output file.

20. The method of claim 19, further comprising the steps of:
   modifying a subset of the input symbols;
   identifying one or more subsets S that collectively include all of the modified input symbols;
   identifying the output symbols that were generated using the one or more subsets;
   regenerating the output symbols that were generated using the one or more subsets; and
   replacing corresponding output symbols in the output file with output symbols regenerated in the step of regenerating.

21. A method of transmitting data from a source through a plurality of channels, comprising the steps of:
   a) arranging the data to be transmitted as an ordered set of input symbols;
   b) generating a plurality of output symbols for each of the plurality of channels, wherein each output symbol is generated by the steps of:
      1) selecting, from a key alphabet, a key I for the output symbol being generated, wherein the key alphabet contains many more members than the number of input symbols in the ordered set of input symbols;
      2) determining a weight, W(I), as a function of I, wherein weights W are positive integers that vary between at least two values and are greater than one for at least some keys in the key alphabet;
      3) identifying a subset S of the input symbols;
      4) selecting W(I) of the input symbols in subset S according to a function of I, thus forming a list AL(I) of W(I) input symbols associated with the output symbol; and
      5) calculating a value B(I) of the output symbol from a predetermined value function of the associated W(I) input symbols;
   c) packetizing at least one of the plurality of output symbols into each of a plurality of packets; and
   d) transmitting the plurality of packets over the plurality of channels, wherein at least two of the plurality of channels carry packets containing output symbols generated with distinct values for key I.

22. The method of claim 21, wherein the step of identifying subset S is a step of identifying a subset that depends on I.

23. The method of claim 21, wherein the step of identifying subset S comprises the steps of:
   selecting, from the plurality of input symbols, a window having a center C relative to input symbols; and
   selecting as S a subset S(C) of input symbols according to a function of C, wherein each of the input symbols of the subset S(C) are input symbols within the window.

24. An output symbol generator, wherein the output symbol is selected from an output alphabet and the output symbol is such that an input file, comprising an ordered plurality of input symbols each selected from an input alphabet, is recoverable from a set of such output symbols, the output symbol generator comprising:
   a weight selector that selects a weight W for the output symbol, where W is a positive integer, where at least two output symbols have different values for W associated therewith, and where W is greater than one for at least one output symbol;
   an associator, coupled to the weight selector, that generates a list AL of W associated input symbols within a subset S of the input symbols comprising the input file, to be associated with the output symbol; and
   a calculator, coupled to the associator, for calculating an output symbol value from a predetermined function of the W associated input symbols indicated by AL.

25. The output symbol generator of claim 24, wherein the number of possible output symbols is much larger than the number of input symbols in the input file.

26. The output symbol generator of claim 24, wherein the weight selector includes an input for a key I and logic to select W based on I and wherein the associator includes an input for a key I and logic to select AL based on I.

27. The output symbol generator of claim 26, further comprising a window generator that generates a representation of a window that defines subset S, the window generator having an output coupled to the associator.

28. The output symbol generator of claim 27, wherein the window generator includes logic to slide the window to an adjacent position in the input file after one or more output symbols are generated.

29. The output symbol generator of claim 28, further comprising:
   a buffer for a plurality of output symbols output by the calculator; and
   logic for reordering the buffered output symbols prior to transmission.

30. The output symbol generator of claim 29, wherein the logic for reordering is logic for pseudorandomly reordering.

31. A transmitter that transmits the information content of an input file, where the input file is an ordered plurality of input symbols each selected from an input alphabet and the input file is recoverable from a set of output symbols each selected from an output alphabet, the transmitter comprising:
   an output symbol generator that generates a plurality of output symbols, comprising
      a) an associator that associates a list AL of W input symbols with an output symbol being generated, wherein the list AL is a list of input symbols within a subset S of the input symbols comprising the input file, where W is a positive integer, where at least two output symbols have different values for W associated therewith, and where W is greater than one for at least one output; and
      b) a value generator, coupled to the associator, that generates an output symbol value from a predetermined function of the W associated input symbols indicated by AL; and
   an output symbol packager that prepares an output symbol output by the output symbol generator for transmission.

32. The transmitter of claim 31, wherein the number of possible output symbols is much larger than the number of input symbols in the input file.

33. The transmitter of claim 31, further comprising the steps of:
   a first memory for storing at least some of the input symbols that are in the subset S;
   a second memory for storing at least some of the input symbols that are not in the subset S, wherein access times for the first memory are shorter than access times for the second memory;
   logic to remove old input symbols from the first memory when the subset S changes and the old input symbols are no longer members of subset S; and
   logic to move new input symbols from the second memory to the first memory when the new input symbols are added as members of subset S and memory locations are available in the first memory.

34. A transmission system including a plurality of the transmitters of claim 31, wherein each of the transmitters transmits an independent plurality of output symbols representing the information content of the input file, the independent pluralities being independent in that each of the transmitters determines its lists of associated input symbols without requiring reference to lists generated by other transmitters without one transmitter entirely duplicating the information output of another transmitter, the transmission system further including:

a receiver having inputs to receive outputs of the plurality of transmitters; and logic to decode the input file from the output symbols received by the receiver.

35. The transmission system of claim 34, further comprising a plurality of channels wherein each of the channels carries the output of one of the transmitters.

36. A transmission system comprising:

an input for receiving an ordered set of input symbols;

an output symbol generator comprising:

1) a key input for receiving a key I, selected from a key alphabet, for an output symbol being generated, wherein the key alphabet contains many more members than the number of input symbols in the ordered set of input symbols;

2) a weight selector, coupled to the key input, that determines a weight, W(I), as a function of I, wherein weights W are positive integers that vary between at least two values and are greater than one for at least some keys in the key alphabet;

3) a subset selector that selects a subset S of the input symbols;

4) an associator, coupled to the key input, the weight selector and the subset selector, wherein the associator includes logic for selecting W(I) of the input symbols in subset S according to a function of I, thus forming a list AL(I) of W(I) input symbols to be associated with the output symbol being generated; and 5) a calculator, coupled at least to the associator, that calculates a value B(I) of the output symbol being generated from a predetermined value function of the associated W(I) input symbols;

a packetizer that packetizes at least one of the plurality of output symbols into each of a plurality of packets; and a transmit module that outputs the plurality of packets over the plurality of channels such that at least two of the plurality of channels carry packets containing output symbols generated with distinct values for key I.

37. An input symbol decoder that decodes input symbols from output symbols, wherein the output symbols are selected from an output alphabet and output symbols are such that an input file, comprising an ordered plurality of input symbols each selected from an input alphabet, is recoverable from a set of such output symbols, and wherein each output symbol has a value calculated from a list AL of W associated input symbols selected from a subset S of the input symbols comprising the input file, where W is a positive integer, where at least two output symbols have different values for W associated therewith, and where W is greater than one for at least one output symbol, the input symbol decoder comprising:

a buffer that holds received output symbols;

a memory that maintains, for each output symbol, a current weight;

an input symbol recoverer that recovers input symbols using output symbols in the buffer that have a current weight less than or equal to a recovery weight;

an output symbol recalculator that calculates a reduced value for an output symbol based on an input symbol associate recovered by the input symbol recoverer, wherein the reduced value is an output symbol value that is independent of the recovered input symbol, the output symbol recalculator including logic to reduce the current weight of the output symbol to reflect the independence from the recovered input symbol.

38. The input symbol decoder of claim 37, wherein the recovery weight is one.

39. The input symbol decoder of claim 37, wherein the number of possible output symbols is much larger than the number of input symbols in the input file.

40. The input output decoder of claim 37, further comprising a window generator that generates a representation of a window that defines subset S.

41. The input symbol generator of claim 37, further comprising:

a first memory for storing at least some of the input symbols that are in the subset S;

a second memory for storing at least some of the input symbols that are not in the subset S, wherein access times for the first memory are shorter than access times for the second memory;

logic to remove old input symbols from the first memory when the subset S changes and the old input symbols are no longer members of subset S; and logic to move new input symbols from the second memory to the first memory when the new input symbols are added as members of subset S and memory locations are available in the first memory.

42. The input symbol generator of claim 37, wherein the buffer maintains the output symbols according to a window position and the input symbol recoverer includes logic for processing the output symbols in the order stored.

43. The input symbol generator of claim 37, wherein the input symbol recoverer includes logic for processing the output symbols in an order determined by most recent recovered associates.

44. The input symbol generator of claim 37, wherein the input symbol recoverer includes logic for processing the output symbols in an order determined by least recent recovered associates.

* * * * *